United States Patent

Stahnke

[15] 3,674,972
[45] July 4, 1972

[54] WELDED JOINT STRAPPING MACHINE
[72] Inventor: Edward J. Stahnke, Riverdale, Ill.
[73] Assignee: Interlake, Inc., Chicago, Ill.
[22] Filed: Oct. 27, 1970
[21] Appl. No.: 84,377

[52] U.S. Cl. ............................................. 219/56, 100/33
[51] Int. Cl. ........................................................ B23k 1/00
[58] Field of Search .................... 219/56, 57, 58, 91, 117;
100/4, 29, 33

[56] References Cited

UNITED STATES PATENTS

| | | | |
|---|---|---|---|
| 2,882,814 | 4/1959 | Winkler et al. | 100/29 X |
| 3,439,606 | 4/1969 | Bursik et al. | 100/29 X |
| 2,614,487 | 10/1952 | Cheesman | 100/29 X |
| 3,327,618 | 6/1967 | Cook | 100/4 |

Primary Examiner—R. F. Staubly
Assistant Examiner—Gale R. Peterson
Attorney—Prangley, Clayton, Mullin, Dithmar & Vogel

[57] ABSTRACT

A strapping machine comprises gripping jaws for holding a strap encircled about an object with a free end portion of the strap overlapping the supply portion thereof, means for tensioning the loop about the object, a pair of welding electrodes disposed between the object and the overlapped portions of the strap, a shorting bar disposed on the opposite side of the overlapped portions of the strap, a shear blade for severing the welded strap loop from the strap supply, first drive mechanism for operating the shear blade and for moving the electrodes and shorting bar between a spaced-apart strap-passing position and a welding position clamping the free end portion of the strap against the overlapping tensioned portion, second drive mechanism for opening and closing the gripping jaws and for moving the electrodes laterally between the strap-passing position and a strap-releasing position disposed from between the strap and the object, and control apparatus actuating the drive mechanisms to sequentially tension the loop, weld the joint, relieve the strap tension, sever the strap, open the gripping jaws and move the electrodes to the releasing position.

30 Claims, 14 Drawing Figures

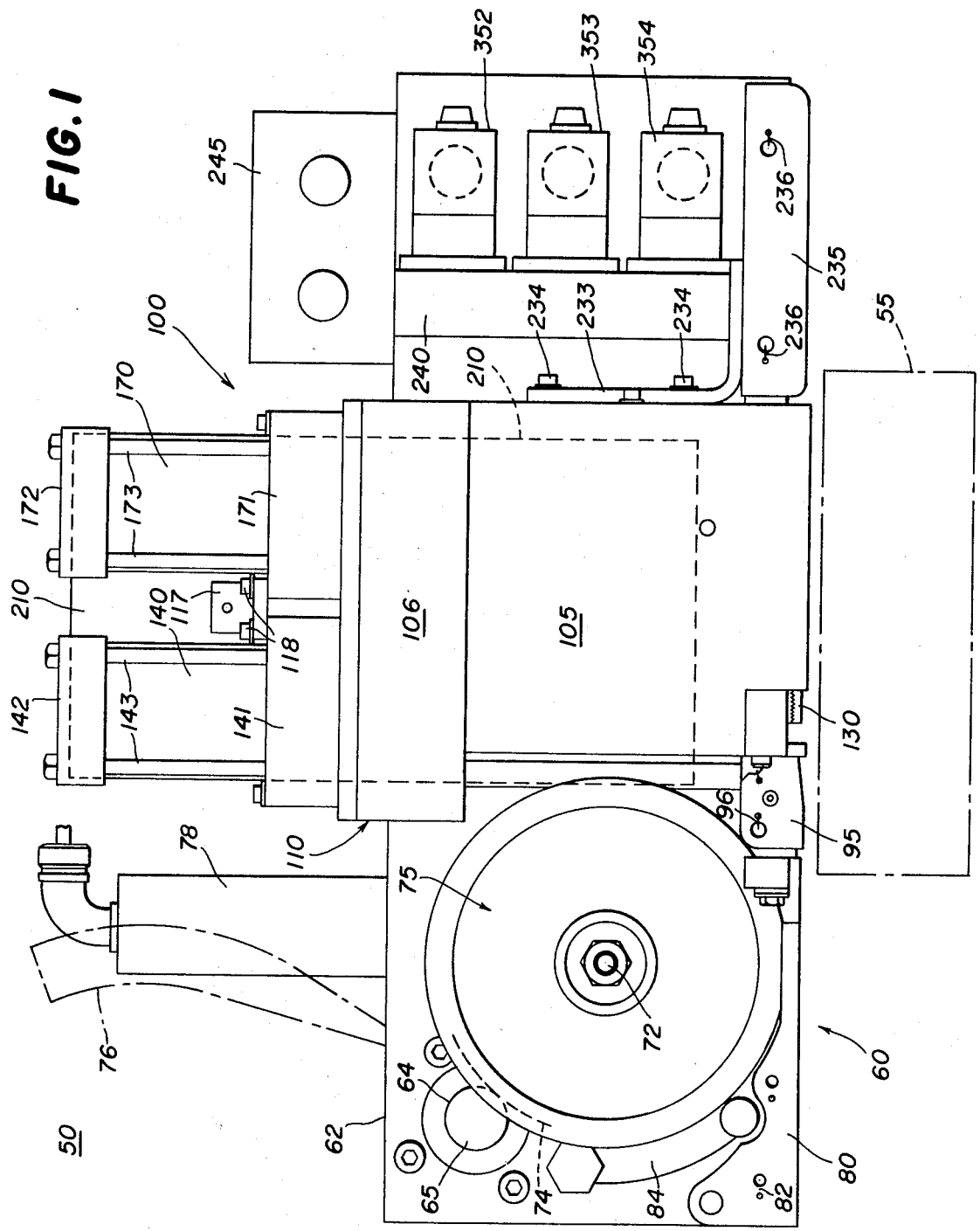

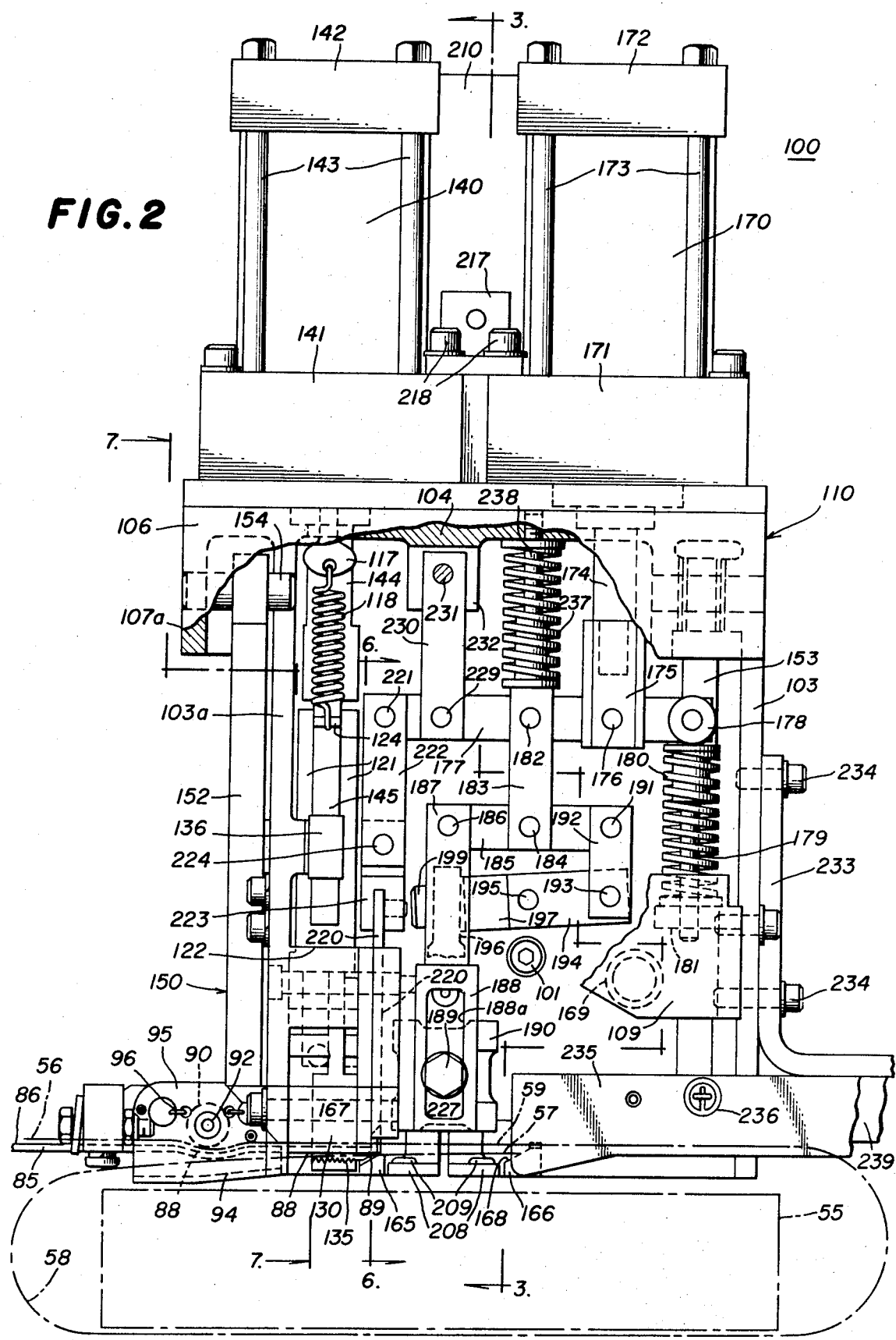

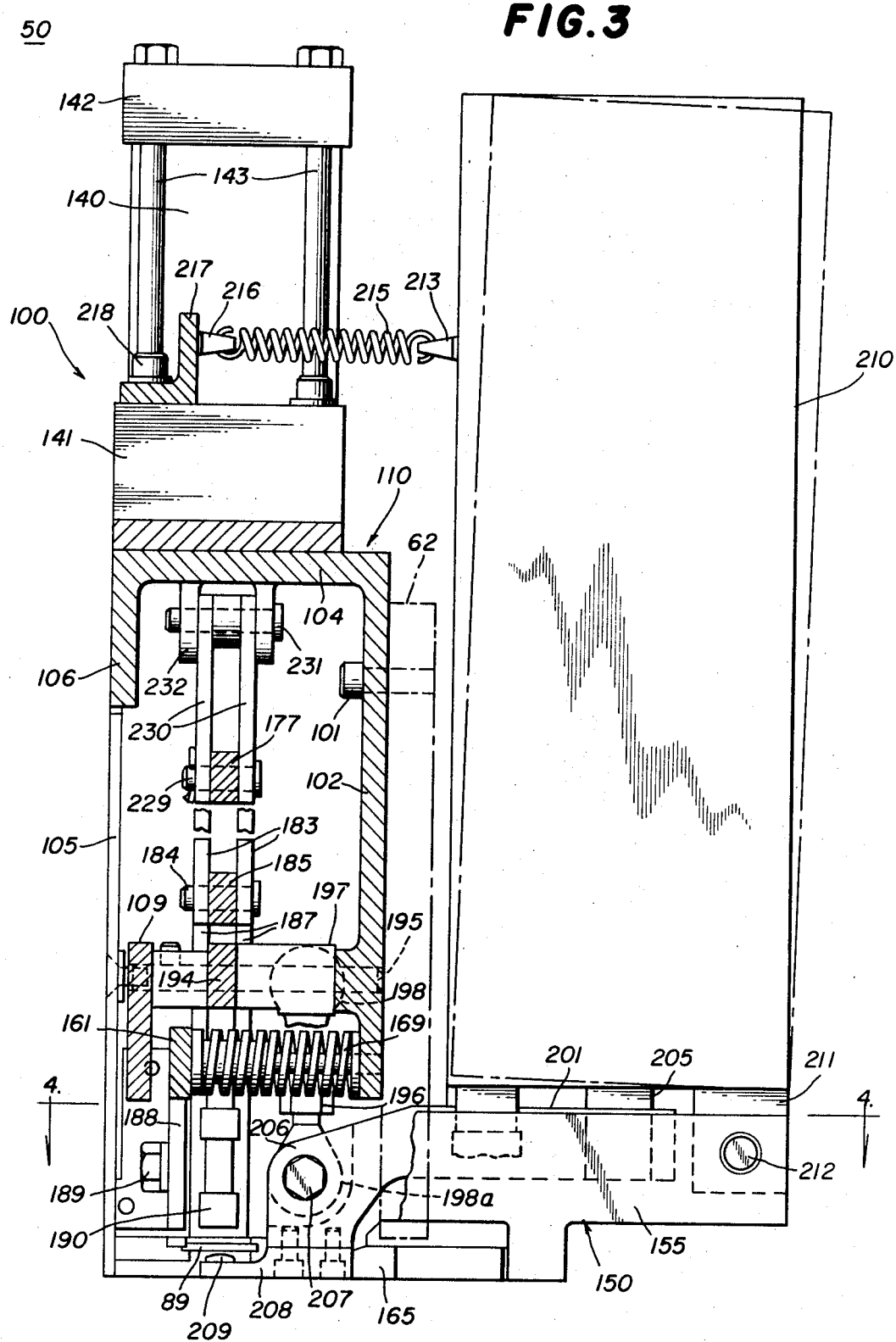

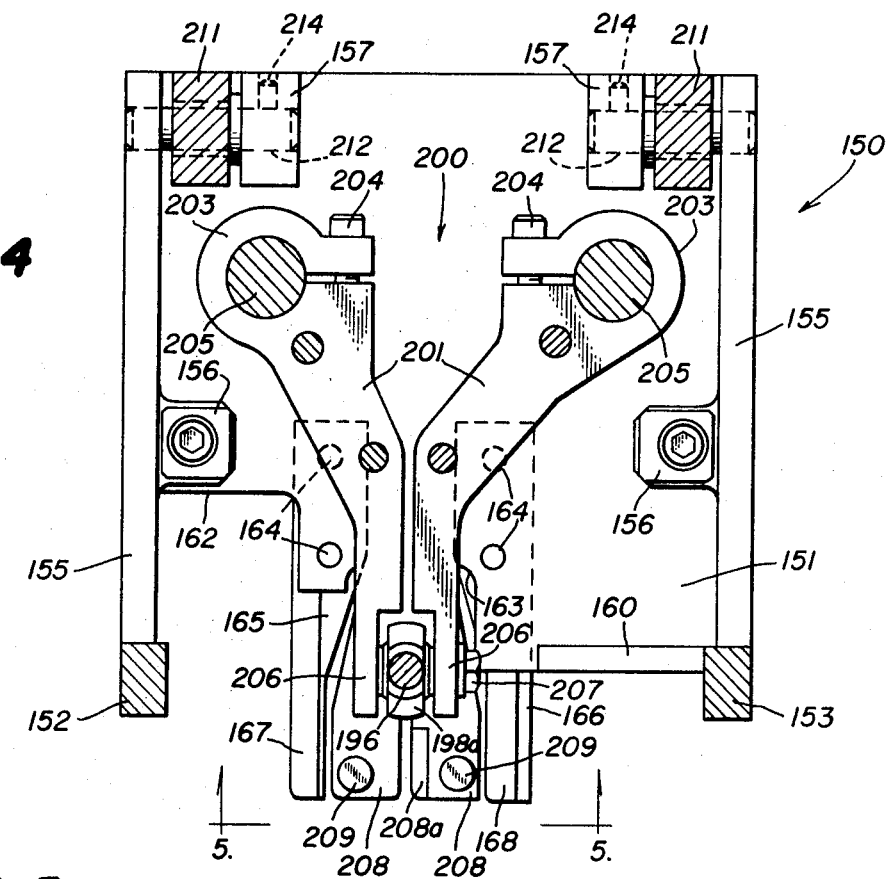

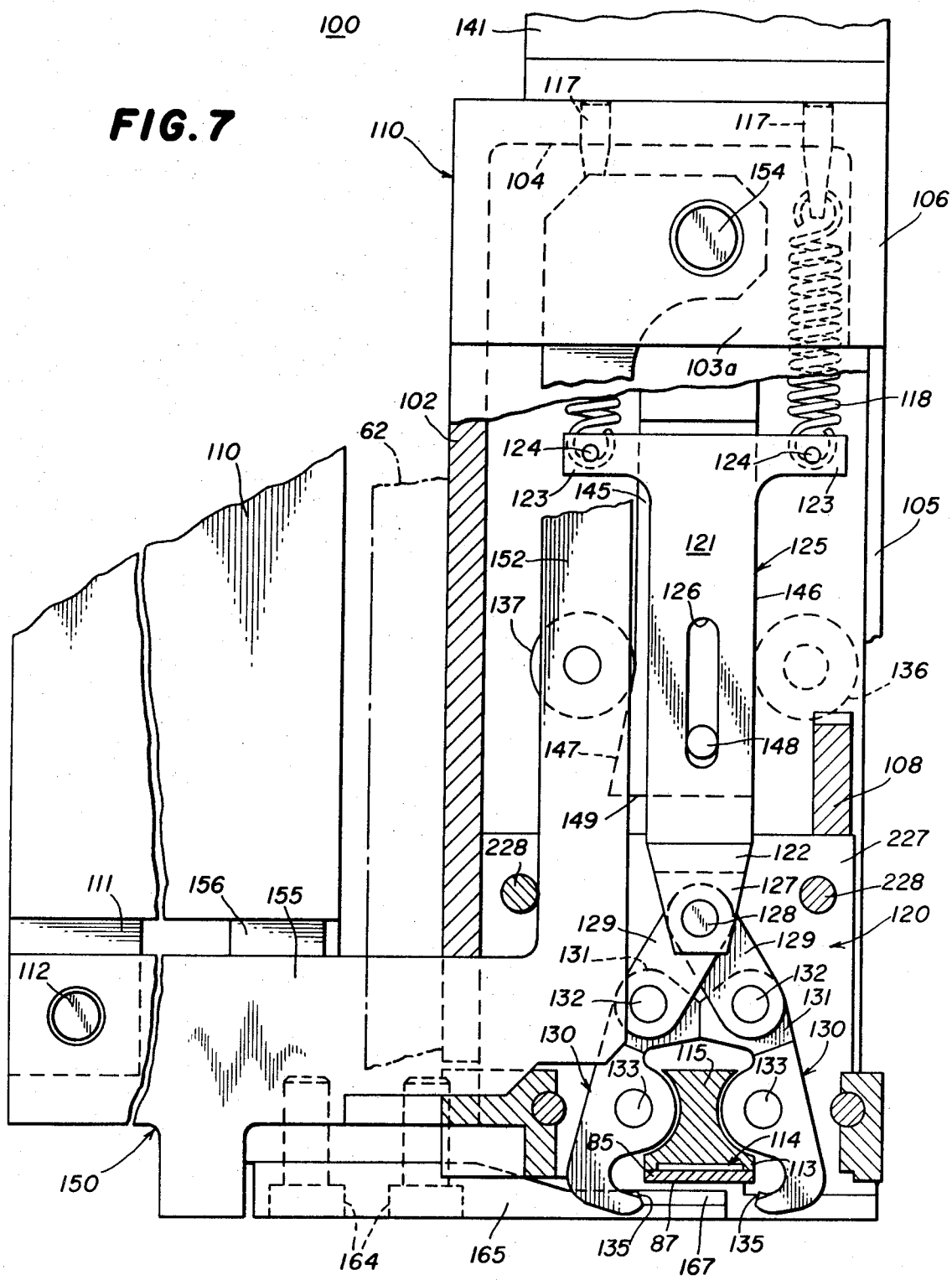

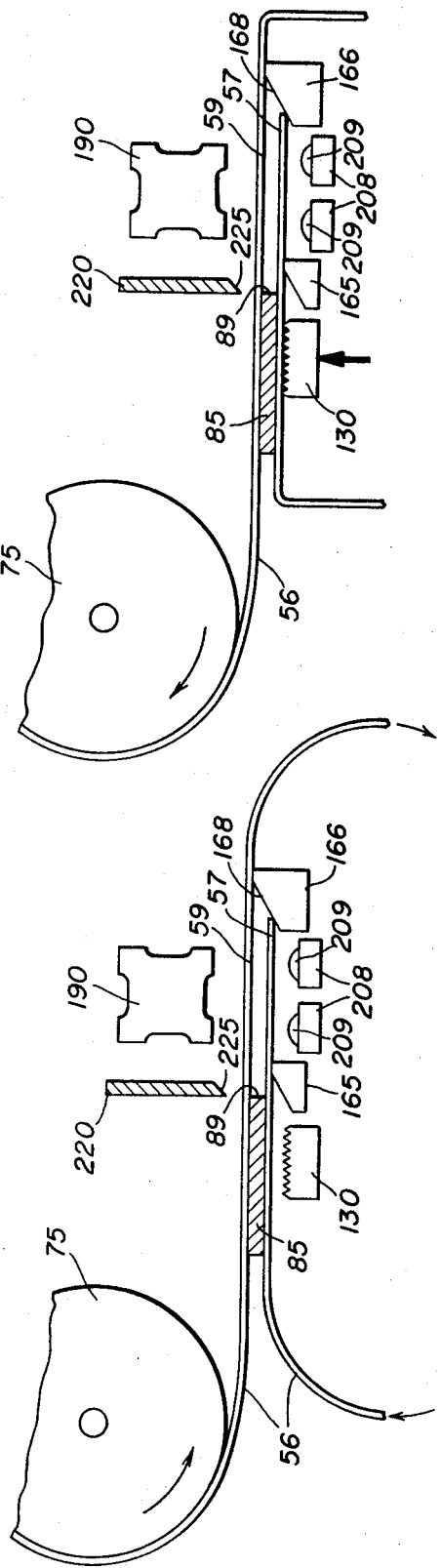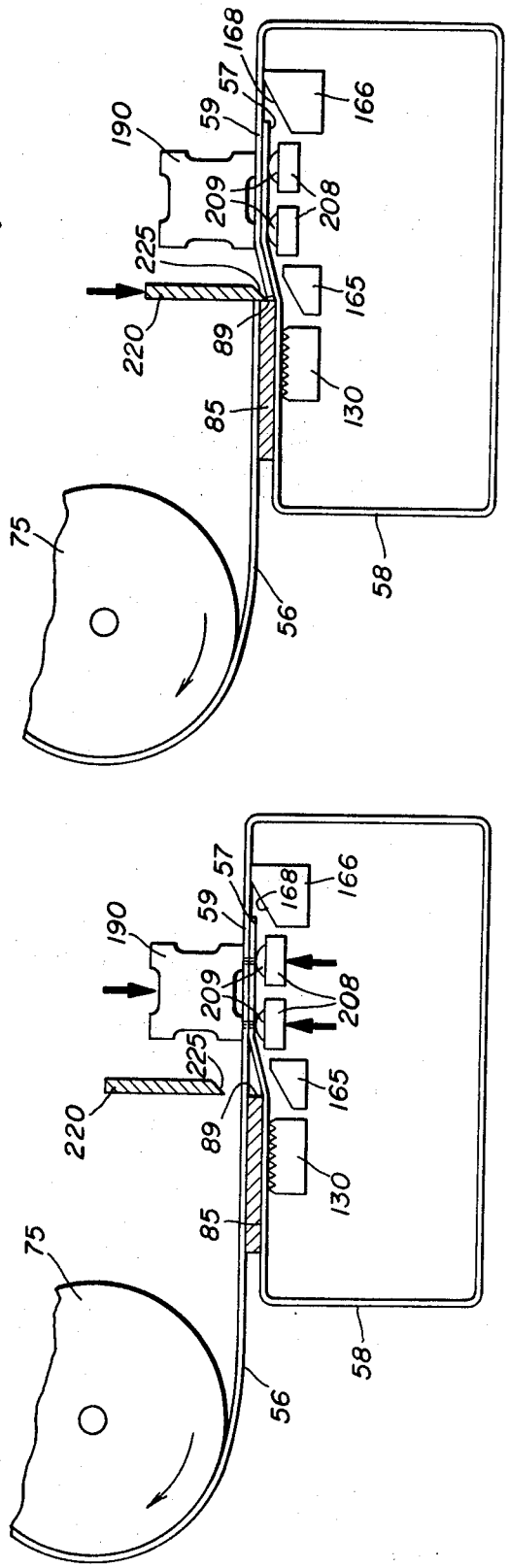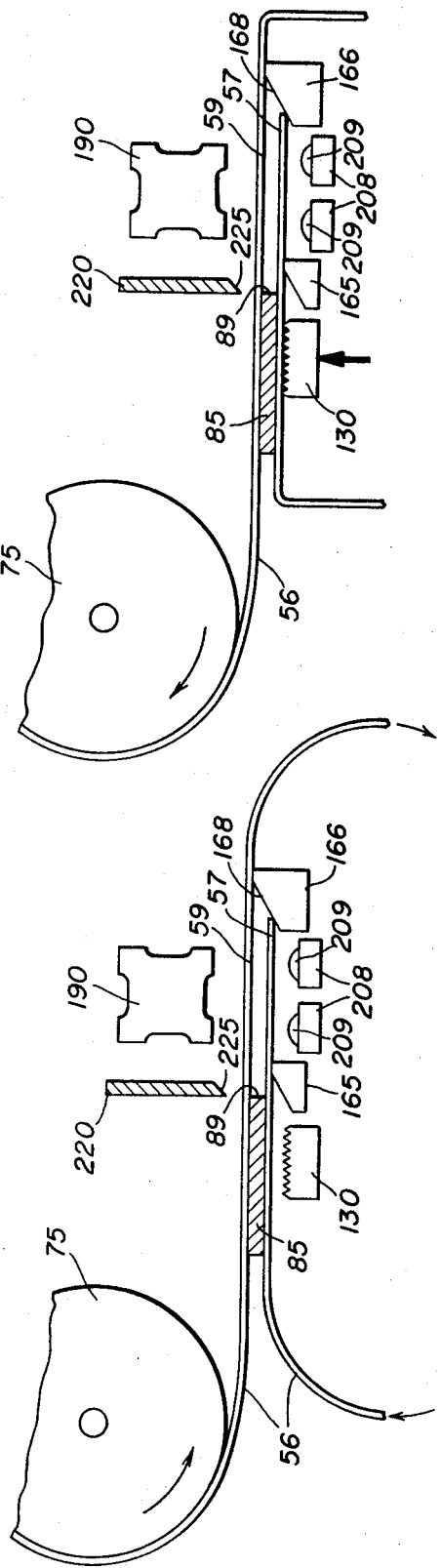

WELDED JOINT STRAPPING MACHINE

This invention relates to a strapping machine for applying flexible straps around packages or other objects. In particular, this invention relates to a strapping machine for forming a welded joint between the overlapping strap ends for securing the strap about the object.

It is a general object of this invention to provide a welded joint strapping machine for forming a welded joint when the strap is in its tensioned condition, the welding means being movable to permit release of the welded strap therefrom in any of a plurality of mutually perpendicular directions.

It is an important object of this invention to provide a strapping machine for securing a length of strap around an object, the strapping machine comprising a strap gripper for gripping the strap adjacent to the leading end thereof to provide a free end portion and for holding the strap encircled in a loop about the object with the free end portion of the strap overlapping the supply portion thereof, tensioning means for tensioning the loop of strap by withdrawing the supply portion thereof relative to the leading end thereof to provide a tensioned reach of strap overlapping the free end portion thereof, two welding contact members respectively disposed on opposite sides of the overlapped portions of the strap and each movable respectively between a strap-passing position therefor and a welding position therefor, the welding contact members in the strap-passing positions thereof being spaced apart for accommodating ready passage of the strap therebetween, the welding contact members in the welding positions thereof cooperating firmly to clamp the free end portion of the strap against the tensioned reach of strap and between the welding contact members, drive mechanism coupled to the welding contact members for effecting movement thereof between the strap-passing positions and the welding positions thereof, movement of the welding contact members to the welding positions thereof effecting movement of the free end portion of the strap toward and into contact with the overlapping tensioned reach thereof, and means coupling the welding contact members to a source of electric power for forming a welded joint between the free end portion of the strap and the overlapping tensioned reach thereof when the welding contact members are in the welding positions thereof.

It is another object of this invention to provide a strapping machine of the type set forth, which further includes first and second guide members spaced apart a predetermined distance longitudinally of the strap and cooperating to define a joint forming region therebetween, the strap gripper being disposed adjacent to one of the guide members out of the joint forming region for holding the strap in the loop with the supply portion thereof extending across the guide members to provide a tensioned reach of strap after tensioning of the loop, the free end portion of the strap being moved against the tensioned reach thereof by the welding contact members in the welding positions thereof.

In connection with the foregoing object, it is another object of this invention to provide a strapping machine of the type set forth, which further includes a shear blade movable between a retracted position out of contact with the strap and a shearing position for severing the supply portion of the strap from the welded strap loop, second drive mechanism coupled to the shear blade for effecting movement thereof, and control apparatus coupled to the drive mechanisms and responsive to movement of the welding contact members to the strap-passing positions thereof for operating the second drive mechanism to move the shear blade to the shearing position thereof.

It is another object of this invention to provide a strapping machine of the type set forth, wherein the welding contact members include a pair of welding electrodes disposed on one side of the overlapped portions of the strap and a shorting bar disposed on the other side thereof.

Yet another object of this invention is to provide a strapping machine for securing a length of strap around an object, the strapping machine comprising a strap gripper for holding the strap encircled in a loop about the object with the leading end of the strap overlapping the supply portion thereof, tensioning means for tensioning the loop of strap by withdrawing the supply portion thereof relative to the leading end thereof, welding means for forming a welded joint between the overlapped portions of the strap and movable between a welding position and a releasing position, the welding means in the welding position thereof extending between the object and the strap and holding the overlapped portions of the strap in contact with each other for forming a welded joint therebetween, the welding means in the releasing position thereof being disposed from between the object and the strap for accommodating removal of the welded strap loop from the welding means in any of a plurality of directions substantially normal to the longitudinal axis of the adjacent portion of the strap, and drive mechanism coupled to the welding means for effecting movement thereof between the welding position and the releasing position thereof, whereby the strapping machine accommodates ready release of the strapped object therefrom.

In connection with the foregoing object, it is another object of this invention to provide a strapping machine of the type set forth, wherein the welding means includes a first welding contact member disposed adjacent to the overlapped portions of the strap on the side thereof away from the object, and a second welding contact member disposed adjacent to the overlapped portions of the strap and movable laterally thereof between the welding position and the releasing position, the drive mechanism being coupled to the second welding contact member for effecting movement thereof between the welding position and the releasing position thereof in directions laterally of the overlapped portions of the strap.

It is another object of this invention to provide a strapping machine of the type set forth, wherein the first welding contact members disposed on the side of the strap away from the object is movable between the strap-passing position and the welding position, the second welding contact member being movable among the strap-passing position and the welding position and the releasing position, first drive mechanism being coupled to the first and second welding contact members for effecting movement thereof between the strap-passing positions and the welding position thereof and second drive mechanism being coupled to the second welding contact member for effecting movement thereof between the strap-passing position and the releasing position thereof.

Another object of this invention is to provide a strapping machine of the type set forth, wherein the strap gripper includes two gripping members movable between an open configuration and a closed configuration, the gripping members in the open configuration thereof being spaced apart for accommodating the free passage of the strap therebetween, the gripping members in the closed configuration thereof cooperating for securely gripping the strap therebetween to hold the strap encircled in a loop about the object, the drive mechanism which effects movement of the welding means between the strap-passing position and the releasing position thereof also being coupled to the gripping members for effecting movement thereof between the open and closed configurations thereof, and control apparatus coupled to the drive mechanism and responsive to movement of the gripping members to the open configuration thereof for operating the drive mechanism to move the welding means from the strap-passing position thereof to the releasing position thereof.

Yet another object of this invention is to provide a strapping machine of the type set forth wherein the drive mechanism which effects the movement of the welding means between the strap-passing position and the welding position thereof is also coupled to the shear blade for effecting movement thereof between the retracted position and the shearing position thereof.

Further features of the invention pertain to the particular arrangement of the parts of the strapping machine whereby the above-outlined and additional operating features thereof are attained.

The invention, both as to its organization and method of operation, together with further objects and advantages thereof, will best be understood by reference to the following specification taken in connection with the accompanying drawings, in which:

FIG. 1 is a front elevational view of a strapping machine constructed in accordance with and embodying the features of the present invention, and illustrating the orientation of the strapping machine with respect to the strapped object;

FIG. 2 is an enlarged fragmentary view of the joint-forming and gripping head of the strapping machine of FIG. 1, with the front cover plate partially broken away to more clearly show the internal structure of the strapping head;

FIG. 3 is a view in vertical section taken along the line 3—3 in FIG. 2 and illustrating two positions of the welding transformer;

FIG. 4 is a view in horizontal section taken along the line 4—4 in FIG. 3 and rotated 90° counterclockwise;

FIG. 5 is a fragmentary front elevational view of the welding electrode linkage taken in the direction of the arrows along the line 5—5 in FIG. 4;

FIG. 6 is a fragmentary view in vertical section taken along the line 6—6 in FIG. 2, and further illustrating the welding electrode linkage;

FIG. 7 is a fragmentary view in vertical section taken along the line 7—7 in FIG. 2, and illustrating the drive linkage for the gripping jaws;

FIG 8 is a diagrammatic view illustrating the relative positions of the various parts of the strapping machine when the strap has been fed into a loop around the object but prior to gripping thereof;

FIG. 9 is a diagrammatic view similar to FIG. 8, and illustrating the relationship of the parts of the strapping machine after the strap loop has been gripped and tensioned about the object;

FIG. 10 is a diagrammatic view similar to FIG. 8, and illustrating the relative positions of the parts of the strapping machine during formation of the welded joint;

FIG. 11 is a diagrammatic view similar to FIG. 8, and illustrating the relative positions of the parts during severing of the welded strap loop from the supply portion of the strap;

Figure 12:
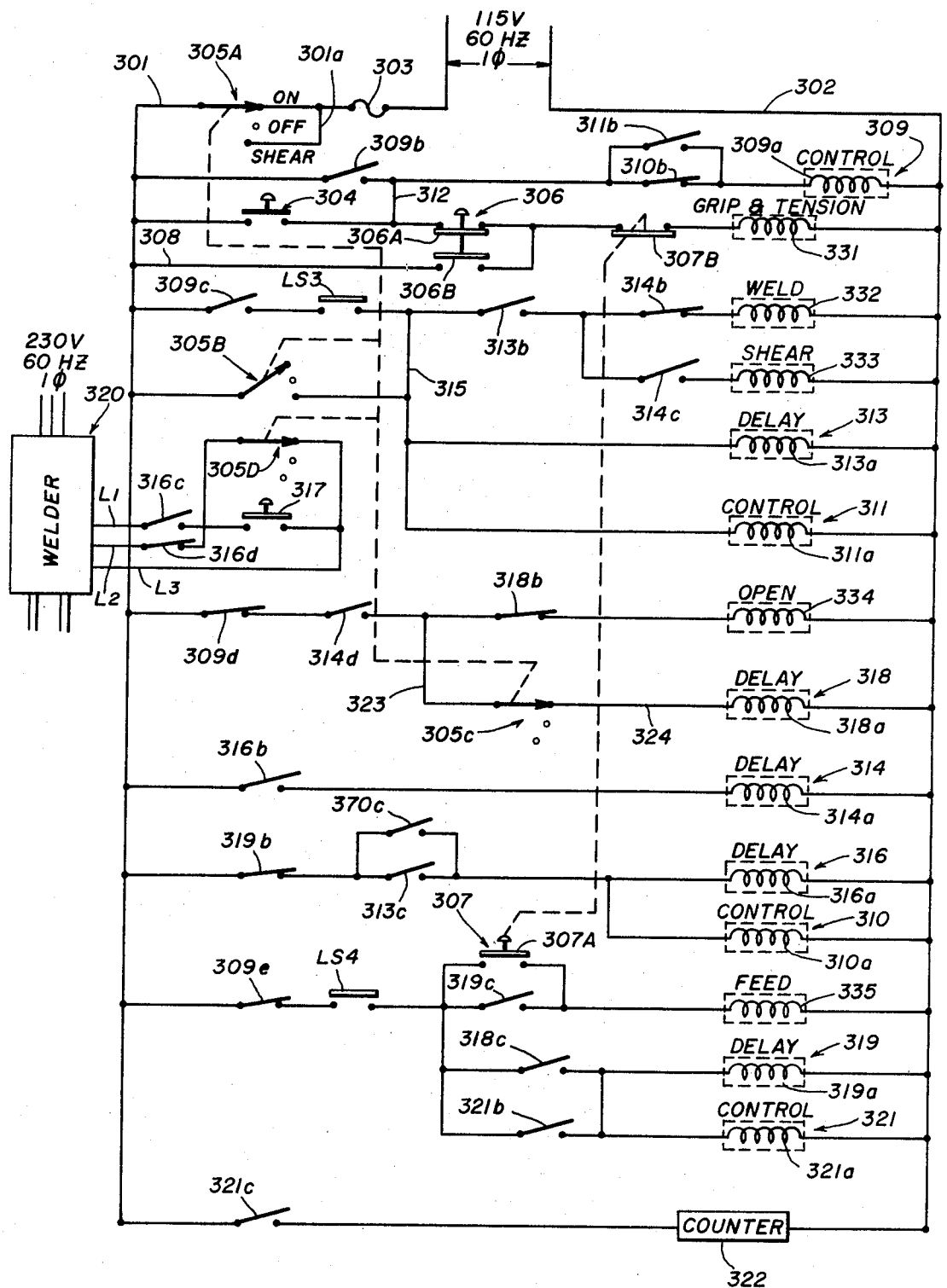
FIG. 12 is a schematic circuit diagram of the electric control circuit for the strapping machine of the present invention.

Referring now to FIG. 1 of the drawings, there is illustrated a strapping machine, generally designated by the numeral 50, and including a strap feeding and tensioning portion, generally designated by the numeral 60, and a joint-forming and gripping head, generally designated by the numeral 100. The strapping machine 50 is utilized to apply a length of flexible strap 56 around an object 55 positioned with respect to the strapping machine 50 as illustrated in FIG. 1. The strapping machine 50 includes a main support plate 62 on which are mounted the various components of the strapping machine 50. A feed wheel 65 is mounted on the front side of the main support plate 62, as viewed in FIG. 1, for rotation about an axis disposed substantially normal to the support plate 62, the feed wheel 65 being provided with a serrated annular outer wall 64. The feed wheel 65 is preferably coupled to and is rotatably driven by an air motor 70, schematically illustrated in FIG. 14, and preferably mounted on the opposite side of the main support plate 62. Also mounted on the front side of the main support plate 62 for rotation about a shaft 72 is an idler wheel 75 having a diameter substantially greater than the diameter of the feed wheel 65 and being provided with a serrated annular outer wall 74 disposed in tangential engagement with the serrated wall 64 of the feed wheel 65 for frictionally gripping a strap web 56 therebetween.

The strap web 56 is fed from a suitable supply thereof through an input chute 76 and thus between the serrated walls 64 and 74 of the feed wheel 65 and idler wheel 75, respectively, the leading end of the strap web 56 then being guided around the periphery of the idler wheel 75 in a counterclockwise direction, as viewed in FIG. 1. An arcuate guide plate 84 is mounted on the main support plate 62 adjacent to the periphery of the idler wheel 75 for cooperation therewith to guide the strap web 56 to and between a pair of parallel, spaced-apart guide plates 80 mounted adjacent to the bottom edge of the main support plate 62. The guide plates 80 are each provided with retaining flanges (not shown) along the bottom edges thereof extending inwardly toward each other and cooperating to provide a guide chute for the strap web 56. The guide plates 80 are resiliently urged toward one another by means of tension springs 82, the springs 82 permitting separation of the guide plates 80 for removal of the strap web 56 from therebetween after the strap 56 has been secured in a loop 58 about the object 55, as will be explained in greater detail hereinafter. Also mounted on the main support plate 62 and extending upwardly therefrom is a limit switch housing 78 for supporting a limit switch LS3, schematically illustrated in FIG. 12, and the function of which will be described below.

Referring now also to FIGS. 2 through 7 of the drawings, a backing plate 85 is mounted adjacent to the bottom edge of the main support plate 62 and extends from between the guide plates 80 toward the right, as illustrated in FIGS. 1 and 2, and into the joint-forming and gripping head 100. The backing plate 85 is provided with an upper flat guide surface 86 having a generally arcuate concave straightening portion 88 intermediate the ends thereof and terminating in the head 100 at a shear end 89. The backing plate 85 has a bottom guide surface 86a parallel to the upper surface 86 and provided at the right-hand end thereof, as viewed in FIG. 2, with a gripping portion 87 which may be provided with teeth or serrations (not shown) therealong. Mounted adjacent to the straightening portion 88 of the backing plate 85 on opposite lateral sides thereof is a pair of side plates 95, each provided with a retaining flange 94 extending inwardly toward each other and disposed a slight distance below the surface of the backing plate 85 and cooperating therewith to provide a guide chute for the leading end 57 of the strap web 56 after it has been fed around the object 55. The side plates 95 are resiliently urged together by means of tension springs 96, the springs 96 permitting separation of the side plates 95 to allow removal of the strap web 56 from therebetween after the strap loop 58 has been secured about the object 55, as will be described below. Mounted adjacent to the straightening portion 88 of the backing plate 85 for rotation about a shaft 92 is a straightening roll 90 having an annular circumferential surface spaced from the straightening portion 88 of the backing plate 85 by a distance slightly less than the thickness of the strap web 56 for effecting straightening thereof in a well known manner.

The joint-forming and gripping head 100 is provided with a housing, generally designated by the numeral 110, including an upstanding back wall 102 secured by means of mounting screws 101 to the main support plate 62 and integral at the upper end thereof with a forwardly extending top wall 104, and a pair of opposed side walls 103 and 103a. A front wall 106 extends a short distance downwardly from the front edge top wall 104 substantially parallel to the back wall 102. Spaced a slight distance inwardly from the side wall 103 and disposed substantially parallel thereto is a bearing plate 107 integral at the upper end thereof with the top wall 104 and extending downwardly therefrom to the bottom of the front wall 106. A similar bearing plate 107a is spaced a slight distance outwardly from the other one of the side walls 103 parallel thereto. Each of the side walls 103 and 103a and bearing plates 107 and 107a is provided with horizontally aligned openings therethrough for a purpose to be described below.

Mounted within the housing 110 adjacent to the left-hand end thereof, as viewed in FIG. 2, is a gripping jaw assembly, generally designated by the numeral 120. A bridge member 115 overlies the inner or gripping end of the backing plate 85, the bridge member 115 being provided with a pair of depending side flanges 113 abutting against the upper surface 86 of the backing wall 85 and cooperating therewith to provide a guide slot 114 between the bridge member 115 and the backing wall 85 dimensioned to accommodate passage of the strap web 56 therethrough. Secured to the top wall 104 of the housing 110 just inside the side wall 103a is a pair of spaced-apart eyelet members 117 respectively coupled to the upper ends of a pair of tension springs 118 which depend therefrom, the lower ends of the springs 118 being coupled to a crosshead, generally designated by the numeral 125. The crosshead 125 includes a pair of spaced-apart upstanding plates 121, disposed substantially parallel to the side wall 103, and connected together at the lower ends thereof by a bight portion 122 and each provided at the upper end thereof with a pair of laterally extending arms 123. Extending between the corresponding arms 123 of the pair of plates 121 is a pair of support pins 124 to which the lower ends of the tension springs 118 are respectively coupled for resiliently supporting the crosshead 125 from the top wall 104 of the housing 110. Depending from the bight portion 122 of the crosshead 125 is a pair of legs 127 forming a clevis bracket, the upper ends of a pair of link members 129 being pivotally secured between the legs 127 by means of a coupling pin 128. Both of the crosshead plates 121, as viewed in FIG. 2, are provided with an elongated slot 126 therein for a purpose to be described below.

A pair of gripping jaws, generally designated by the numeral 130, are respectively disposed on opposite sides of the bridge member 115 and are each mounted for pivotal movement about a corresponding one of a pair of pivot pins 133. Each of the gripping jaws 130 is provided with an upper drive end 131 which is connected to the lower end of the adjacent one of the links 129 by means of a connecting pin 132. Each of the gripping jaws 133 is provided at the lower end thereof with a plurality of serrations or gripping teeth 135 for cooperation with the gripping portion of the backing plate 85 for gripping the strap web 56 therebetween in a manner to be described.

Mounted on the top wall 104 of the housing 110 directly above the gripping jaw assembly 120 is a drive piston 140, the piston 140 being secured between a lower mounting block 141 fastened to the top wall 104 of the housing 110 and an upper mounting block 142 by means of a plurality of connecting rods to bolts 143. The piston 140 is provided with a piston rod 144 extending downwardly therefrom through a complementary opening in the top wall 104 of the housing 110, the piston rod 144 being coupled at the lower end thereof to the upper end of a cam member 145. The cam member 145 extends downwardly between the plates 121 of the crosshead 125 and is provided with a front guide surface 146 and a rear camming surface 147. Mounted on the adjacent one of the side walls 103 of the housing 110 is a guide roll 136, having the circumferential surface thereof disposed in guiding engagement with the guide surface 146 of the camming member 145 for guiding the vertical movement thereof. The cam member 145 is also provided with a pin 148 adjacent to the lower end thereof and extending outwardly therefrom into the elongated slot 126 in the crosshead plate 121 for sliding movement therealong. The bottom end of the cam member 145 is provided with an abutment surface 149 adapted for engagement with the bight portion 122 of the crosshead 125 to effect downward movement of the crosshead 125. The slot 126 permits movement of the cam member 145 and the crosshead 125 with respect to each other in a manner to be described below.

Pivotally mounted in the housing 110 is a welding carriage, generally designated by the numeral 150, and including a flat, substantially horizontally disposed base plate 151, provided at the opposite front corners thereof with a pair of upstanding suspension arms 152 and 153, each of the suspension arms 152 and 153 being pivotally connected by means of a corresponding pivot pin 154 between the adjacent ones of the side walls 103 and 103a and bearing flanges 107 and 107a of the housing 110, the axes of the pivot pins 154 being disposed substantially normal to the side walls 103 and 103a. The base plate 151 is provided along the opposite side edges thereof with a pair of upstanding side rails 155 extending rearwardly from the suspension arms 152 to the rear end of the base plate 151. Respectively spaced a slight distance inwardly of the rear ends of each of the side rails 155 are two bearing blocks 157. A cam roll 137 is secured to the inner surface of the suspension arm 152 intermediate the ends thereof and substantially in horizontal alignment with the guide roll 136, the circumferential surface of the cam roll 137 being disposed in camming engagement with the camming surface 147 of the cam member 145. Extending inwardly from the suspension arm 153 substantially normal to the side plates 155 is a front plate 160 having an angle mounting bracket 161 secured thereto and extending forwardly from the front surface thereof. A horizontally extending compression spring 169 is held in place between the mounting bracket 161 and the rear wall 102 of the housing 110, the compression spring 169 extending through a complementary opening (not shown) in the front plate 160 and serving to resiliently urge the welding carriage 150 into a home position, best illustrated in FIGS. 3 and 7. The base plate 151 of the welding carriage 150 is also provided with a recessed portion 163 in the front edge thereof to accommodate a welding electrode assembly 200 as will be described below and a recessed portion 162 for accommodating the gripping jaw assembly 120. Respectively secured to the bottom surface of the base plate 151 on opposite sides of the recess 163 by means of mounting screws 164 are two guide members 165 and 166. Each of the guide members 165 and 166 extends forwardly beyond the front surfaces of the suspension arms 152 and 153, the guide member 165 being provided with an inclined guide surface 167 and the guide member 166 being provided with a similar inclined guide surface 168 for guiding the passage of the strap web 56 through the joint-forming end gripping head 100.

Mounted on the upper surface of the top wall 104 of the housing 110 alongside the drive piston 140 is a drive piston 170, the piston 170 being secured in place between a lower mounting block 171 fastened to the top wall 104 of the housing 110 and an upper mounting block 172 by means of a plurality of connecting rods or bolts 173. The piston 170 is provided with a piston rod 174 extending downwardly therefrom through a complementary opening in the top wall 104 of the housing 110, the lower end of the piston rod 175 being coupled to a coupling member 175. The coupling member 175 is coupled adjacent to the lower end thereof by means of a connecting pin 176 to a generally horizontally extending lever 177, adjacent to the right-hand end thereof, as viewed in FIG. 2. Secured to the right-hand end of the lever 177 is a retaining roll 178 coupled to the upper end of a compression spring 180, the lower end of the compression spring 180 being held in engagement with a support bracket 181 on the front flange 109 of the housing side wall 107a by means of a positioning pin 179 which traps the spring 180 so that it can be compressed but cannot be extended. Connected to the lever 177 adjacent to the center thereof by means of a coupling pin 182 is the upper end of a depending link member 183, the lower end of the link member 183 being connected by means of a pin 184 to a generally horizontally extending crossbar 185, midway the ends thereof. One end of the crossbar 185 is connected by means of a pivot pin 186 to the upper end of a link member 187, the lower end of the link member 187 being coupled to the upper end of an adjustable coupling member 188 having a vertically extending slot 188a therein. Secured to the coupling member 188 by means of a bolt 189 extending through the slot 188a therein is a shorting bar or toggle shoe 190, the shorting bar 190 being vertically positionable with respect to the coupler 188 by appropriate movement of the bolt 189 along the slot 188a. The other end of the cross bar 185 is connected by means of a coupling pin 198 to the upper end of a depending link member 192, the lower end of the link member 192 being connected by means of a pin 193 to one end of a lever 194, which is mounted intermediate the ends thereof for pivotal movement about a pivot pin 195 secured to the housing 110. The other end of the lever 194 is provided with a rearwardly extending flange 197 which is coupled by means of a ball joint 199 to an eyelet 198 in the upper end of a coupling member 196, the coupling member 196 being provided at the lower end thereof with a similar eyelet 198a.

The joint-forming and gripping head 100 is further provided with a welding electrode assembly, generally designated by the numeral 200, the electrode assembly 200 including a pair of electrode arms 201. Each of the electrode arms 201 is provided at the rear end thereof with a split-ring clamp portion 203, each of the split-ring clamp portions 203 being disposed in surrounding relationship with a corresponding one of a pair of welding transformer terminals 205, the clamp portions 203 being tightened about the terminals 205 by means of tightening screws 204. Each of the welding arms 201 extend forwardly from the transformer terminals 205 centrally of the base plate 151, each of the arms 201 being provided adjacent to the front end thereof with an elbow 206 provided with a depending foot 208 having a welding contact 209 on the upper surface thereof adjacent to the front end thereof. The feet 208 are disposed between the guide members 165 and 166, with the upper surfaces of the contacts 209 being substantially coplanar and parallel to the substantially coplanar upper surfaces of the backing plate 85 and the guide member 166. The right-hand one of the feet 208, as viewed in FIGS. 4 and 5, is provided with an inclined guide surface 208a to facilitate the guiding of the strap web 56 over the feet 208.

A welding transformer 210 is mounted on the base plate 151 of the welding carriage 150, the transformer 210 being provided at the bottom rear end thereof with a pair of depending mounting feet 211 respectively disposed between the adjacent ones of the side rails 155 and bearing blocks 157 and pivotally secured thereto by means of pivot pins 212, respectively held in place by set screws 214 in the bearing blocks 157. The transformer 210 is provided adjacent the upper end thereof with a connecting ring 213 coupled to one end of a tension spring 215, the other end of the tension spring 215 being coupled to a similar connecting ring 216 secured to one flange of an angle bracket mounting 217, the other flange of the angle bracket 217 bridging the mounting blocks 141 and 171 and secured thereto by means of screws 218. The tension spring 215 resiliently urges the transformer 210 into a home or rest position illustrated in solid lines in FIG. 3 with the front bottom surface of the transformer 210 resting upon support members 156 on the base plate 151 of the welding carriage 150. The weight of the transformer 210 urges the electrode arms 201 downwardly into the position shown in FIGS. 2 and 3 for maintaining a spacing between the shorting bar 190 and the contacts 209 sufficient to permit feeding of the strap web 56 therebetween.

The other end of the lever 177 is connected by means of a coupling pin 221 to the upper ends of a pair of depending links 222, the lower ends of the links 222 being connected by means of a pin 224 to a coupling clevis 223. The clevis 223 is coupled by means of a pair of coupling pins 226 to the upper end of a shear blade 220, the lower end of the shear blade 220 being disposed in a complementary guide slot 227a in a side plate 227, the side plate 227 being disposed substantially parallel to the shear blade 220 and secured to the housing 110 by means of fasteners 228. The shear blade 220 is provided with a knife edge 225 at the bottom end thereof, the shear blade 220 and the side plate 227 being so positioned that the knife edge 225 is disposed immediately above the path of the strap web 56 through the joint-forming and gripping head 100, the knife edge 225 being adapted to cooperate with the shear end 89 of the backing plate 85 to form a pair of shear blades for severing the strap web 56 therebetween.

The lever 177 is coupled at a point between the links 183 and 222 by means of a coupling pin 229 to the lower end of a support arm 230, the upper end of the support arm 230 being connected by means of a pin 231 to a support clevis block 232 depending from the top wall 104 of the housing 110. The upper end of the depending link 183 is coupled to the lower end of a compression spring 237, the upper end of the compression spring being disposed in engagement with the inner surface of the top wall of the housing 110 and being held in position by a positioning pin 238 secured to the top wall 104 of the housing 110 and trapping the spring 237 to permit compression thereof while preventing extension thereof. The compression springs 180 and 237 cooperate to urge the lever 177 into an equilibrium position illustrated in FIG. 2.

Secured to the right-hand side wall 103 of the housing 110, as viewed in FIG. 2, by means of mounting screws 234, is an angle bracket 233 supporting thereon a guide plate 239 extending from the joint forming and gripping head 100. Respectively disposed along opposite sides of this guide plate are a pair of side plates 235 resiliently urged toward each other by means of tension springs 236. The side plates 235 are provided with retaining flanges (not shown) along the bottom edges thereof extending toward each other and cooperating with the guide plate 239 to provide a guide channel for the strap web 56. The springs 236 permit separation of the side plates 235 to allow tensioning of the strap web 56 snugly about the object 55. Secured to the right-hand end of the support plate 62, as viewed in FIG. 1, is a manifold 240 to which are connected three air valves 352, 353 and 354, two additional valves 351 and 355 being secured to the main support plate 62 by means of a valve housing 245.

Referring now also to FIGS. 8 through 11 of the drawings, the mechanical operation of the strapping machine 50 will be described in detail. Initially, the leading end 57 of a strap web 56 is fed from a suitable supply thereof through the input chute 76 between the serrated surfaces 64 and 74 of the feed wheel 65 and the idler wheel 75, respectively. Rotation of the drive wheel 65 by the air motor 70 in a clockwise direction, as viewed in FIG. 1, will then serve to frictionally feed the strap web 56 in a counterclockwise direction around the periphery of the idler wheel 75, along the arcuate guide member 84 and between the guide plates 80 to the backing plate 85. The strap web 56 if then fed along the guide surface 86 of the backing plate 85, between the straightening portion 88 thereof and the straightening roll 90, and into the joint-forming and gripping head 100. It will be noted that as the leading end 57 of the strap web 56 passes from the straightening portion 88 of the backing plate 85, it will be guided through the slot 114 between the backing plate 85 and the bridge member 115. Upon exiting the slot 114, the strap web 56 will be guided by the guide surface 167 of the guide member 165 over the welding contacts 209 of the welding electrode feet 208, and will thence be guided by the guide surface 168 of the guide member 166 between the side plates 235 and the guide plate 239.

After emerging from between the side plates 235, the strap web 56 is then fed in a loop 58 beneath and around the object 55 and back between the retaining flanges 94 of the side plates 95 and the gripping portion of the backing plate 85. It will be noted that, initially, the gripping jaws 130 are in the open position thereof, illustrated in FIG. 7, with the gripping teeth 135 being spaced laterally apart a distance greater than the width of the strap web 56 and being spaced downwardly below the gripping surface 87 of the backing plate 85 by a distance slightly greater than the thickness of strap web 56. Also, the welding assembly is initially positioned in a strap-passing configuration as illustrated in FIG. 2, with the welding contacts 209 being disposed a slight distance below the upper end of the guide member 165 and with the shorting bar 190 being disposed a slight distance above the backing plate 88. The shear blade 220 is initially in its retracted position illustrated in FIGS. 2 and 6, with the knife edge 225 being disposed above the backing plate 88 by a distance greater than the thickness of the strap web 56. Accordingly, the leading end 57 of the strap web 56 is guided by the backing plate 85 between the open gripping jaws 130 and is guided by guide member 165 back over the welding contacts 209, the leading end 57 of the strap web 56 abutting against the guide surface 168 of the guide member 166 to terminate the feeding of the strap web 56. It will be noted that, at this time, the strap web 56 is loosely encircled about the object 55, as illustrated in FIG. 2, with the leading end 57 thereof overlapping the supply portion thereof in a welding region between the guide members 165 and 166 and between the welding contacts 209 and the shorting bar 190, the various components of the joint-forming and gripping head 100 being arranged in the configuration diagrammatically illustrated in FIG. 8.

The air motor 70 may now be reversed to take up the slack in the strap loop 58 and tension the strap web 56 about the object 55. Simultaneously with the initiation of operation of the air motor 70 in the tensioning direction, the piston 140 is operated to move the piston rod 144 thereof downwardly from the equilibrium position illustrated in FIGS. 2 and 7. This downward movement of the piston rod 144 effects a corresponding downward movement of the cam member 145, thereby causing the abutment surface 149 thereof to engage the crosshead 125 at the bight portion 122 to move the crosshead 125 downwardly. This downward movement of the crosshead 125 spreads the links 129, thereby pivotally moving the gripping jaws 130 about the pivot pins 133 into a closed position wherein the gripping teeth 135 are disposed in firm engagement with the strap web 56 adjacent to the leading end 57 thereof for securely clamping the strap web 56 against the gripping portion of the backing plate 85. The parts of the strapping machine 50 will now be disposed in the configuration diagrammatically illustrated in FIG. 9, thus permitting the tensioning of the strap web 56 about the object 55. It will be noted that as the tension in the strap web 56 increases, the side plates 95 and 235 will be moved apart by the strap web 56 against the urging of the retaining springs 96 and 236 to permit the strap web 56 to move into firm engagement with the edges of the object 55.

When the strap web 56 has been tensioned to a predetermined tension about the object 55, the air motor 70 will stall to maintain tension in the strap and the limit switch LS3 will be actuated for causing the piston 170 to be operated for moving the piston rod 174 thereof downwardly from the equilibrium position illustrated in FIGS. 2, 3 and 5. This downward movement of the piston rod 174 causes a corresponding downward movement to the right-hand end of the lever 177, as viewed in FIG. 2, against the urging of the compression spring 180. This downward movement of the lever 177 causes the lever 177 to pivot about the pivot pin 229 in a clockwise direction, as viewed in FIG. 2, thereby depressing the link 183 and the crossbar 185. The pin 229, in turn pivots slightly with the link 230 about the pin 231 to permit purely vertical movement of the piston rod 175. The downward movement of the crossbar 185 effects, through the links 187 and 192, corresponding downward movement of the shorting bar 190 and the right-hand end of the lever 194, the downward movement of the right-hand end of the lever 194 causing a clockwise pivotal movement of the lever 194 about the pivot pin 195. This pivotal movement of the lever 194 effects an upward movement of the coupling member 196 and a corresponding upward movement of the electrode arm 121 and the welding contacts 209. Thus, the shorting bar 190 and the welding electrodes 209 are urged toward each other in directions substantially normal to the plane of the strap portion 59 to provide spot welds of uniform size and quality, sandwiching the overlapped portions of the strap web 56 therebetween. It will be noted that this upward movement of the electrode arms 201 is accommodated by the pivotal mounting of the transformer 210 on the welding carriage 150 at the pivot pins 212, and by the tension spring 215 coupled to the upper end of the transformer 210.

It is a significant feature of the present invention that the linkage described above causes the welding electrode assembly 200 to seek out the position of the tensioned reach 59 of the strapping web 56 disposed between the shorting bar 190 and the welding contacts 209 and extending between the guide member 166 and the backing plate 85. Thus, when the shorting bar 190 has been moved into contact with the upper surface of the relatively immovable tensioned reach 59 of the strap web 56, the crossbar 185 will begin to pivot in a clockwise direction about the pin 186, thereby causing any further downward movement of the crossbar 185 to be transmitted entirely to the link 192 and, thus, to the lever 194, thereby further raising welding contacts 209. Similarly, if the welding contacts 209 first move the leading end 57 of the strap web 56 into engagement with the relatively immovable tensioned reach 59 of the strap web 56, the resistance afforded by this tensioned reach 59 will prevent further upward movement of the welding contacts 209 and cause the crossbar 185 to pivot in a counterclockwise direction about the pin 191. Thus, any further downward movement of the crossbar 185 will be transmitted entirely to the shorting bar 190 through the link 187. Thus, it will be appreciated that the forces applied to the opposite sides of the overlapped portions of the strap web 56 will be maintained in relative equilibrium and the welding pressure may be applied to the overlapped portions 57 and 59 of the strap 56 while one of these overlapped portions is in a tensioned condition, since no displacement of this tensioned portion of the strap is necessitated by the present invention. Accordingly, after operation of the piston 170 as described above, the parts of the strapping machine 50 will be disposed in the welding configuration illustrated in FIG. 10, with the overlapped portion of the strap 56 clamped between the shorting bar 190 and the welding electrode contacts 209.

At this point, welding current may be applied across the welding contacts 209, the shorting bar 190 completing an electric circuit through the overlapped portions of the strap web 56 for spot welding these overlapped portions together at two spots, respectively immediately overlying the welding contacts 209. After completion of the welded joint, suitable control apparatus causes the piston 170 to be operated for moving the piston rod 174 thereof upwardly through and beyond the equilibrium position illustrated in FIG. 2, thereby returning the shorting bar 190 and the welding contacts 209 to their spaced-apart strap-passing configuration illustrated in FIG. 2. The continued upward movement of the piston rod 174 causes a corresponding upward movement of the right-hand end of the lever 177, as viewed in FIG. 2, against the urging of the compression spring 237, for pivoting the lever 177 in a counterclockwise direction about the pivot pin 229. This pivotal movement of the lever 177 depresses the left-hand end thereof for thereby effecting a corresponding downward movement of the link 222 and the shear blade 220. Thus, the knife edge 225 of the shear blade 220 is passed through the supply portion of the strap web 56, the knife edge 225 cooperating with the shear end 89 of the backing plate 85 for severing the supply portion of the strap web 56 therebetween. At this point, the components of the joint-forming and gripping head 100 will be arranged in the configuration illustrated in FIG. 11.

Upon severing of the strap web 56, the tension in the supply portion thereof is released, permitting the air motor 70 to begin rotation again in the tensioning direction. Immediately thereafter the air motor 70 will be deenergized but, as a result of the momentum of the feed system, the rotation of the air motor 70 will continue for a short time sufficient to pull the severed end of the strap web 56 back between the straightening roll 90 and the straightening portion 88 of the backing plate 85 for straightening the strap end. At this point, the piston 170 may be deactuated to permit return of the shorting bar 190 and the electrode contacts 209 to the equilibrium positions thereof, illustrated in FIG. 2, under the urging of the compression spring 237, thereby retracting the shear blade 220. After severing of the supply portion of the strap web 56 from the completed strap loop 58, the piston 140 may be actuated for moving the piston rod 144 upwardly through and beyond the equilibrium position illustrated in FIGS. 2 and 7. This upward movement of the piston rod 144 effects a corresponding upward movement of the cam member 145 and the pin 148, thereby permitting upward movement of the crosshead 125 under the urging of the tension springs 118. This upward movement of the crosshead 125 pulls the gripping jaws 130 back to the open position thereof, illustrated in FIG. 7, for releasing the adjacent portion of the strap loop 58 from between the gripping jaws 130 and the backing plate 85. When the gripping jaws 130 have been returned to their open position, the elongated slot 126 will permit a further upward movement of the cam member 145 under the urging of the piston rod 144, whereby the engagement of the camming surface 147 with the cam roll 137 causes the welding carriage 150 to be pivoted rearwardly in a clockwise direction about the pivot pins 154, as viewed in FIG. 7. This pivotal movement of the welding carriage 150 moves the welding electrode arms 201 and the welding feet 208 and the guide members 165 and 166 rearwardly from between the object 55 and the strap loop 58. Thus, the completed tensioned strap loop 58 is permitted to snap into firm engagement with the object 55 around the entire periphery thereof, whereby the strapped object 55 may readily be removed from the vicinity of the strapping machine 50 in any of several directions, viz., downwardly, forwardly, rearwardly, to the right or to the left, as viewed in FIG. 2. After removal of the strapped object 55 from the strapping machine 50, the piston 140 may be deactuated, whereupon the spring 169 will urge the welding carriage 150 back to the home position thereof illustrated in FIGS. 2 and 3, the camming action of the cam roll 137 returning the cam member 145 and the piston rod 144 to the equilibrium positions thereof illustrated in FIGS. 2 and 7, in preparation for the initiation of another strapping cycle.

It is noted that the clockwise pivoting of the lever 177 for moving the welding assembly to its welding configuration will cause a slight upward movement of the shear blade 220 and, similarly, that the counterclockwise pivoting of the lever 177 to actuate the shear blade 220 will cause a slight upward movement of the shorting bar 190, but both of these movements are inconsequential. Also, it is noted that the pivotal movements of the welding carriage 150 may result in a slight tilting of the transformer 210, as indicated in FIG. 3, which tilting is accommodated by the pivotal mounting of the transformer 210 on pins 212 and by the tension spring 215.

Referring now to FIG. 12 of the drawings, there is illustrated a schematic circuit diagram of an electric control circuit, generally designated by the numeral 300, for controlling the operation of the strapping machine 50. A pair of input lines 301 and 302 are connected to a source of 115 volt, 60 Hz, single-phase electric power, the control circuitry including a number of branch networks connected in parallel between the input lines 301 and 302. Connected in series in the input line 301 are a fuse 303 and one bank 305A of a four-bank, three-position selector switch 305. The three positions of the selector switch 305 are respectively designated "ON," "OFF," and "SHEAR," the selector switch 305 normally being in the "ON" position illustrated in FIG. 12. The input line 301 is connected directly to the wiper of the contact bank 305A and to the "ON" contact thereof, and is connected by a conductor 301a to the "SHEAR" contact thereof, so that a closed circuit is formed through the contact bank 305A in either the "ON" position of the "SHEAR" position thereof. Connected between the input lines 301 and 302 is a series combination including a manual push-button cycle switch 304, one normally closed pole 306A of a double-pole single-throw manual switch 306, one normally closed pole 307B of a double-pole single-throw manual switch 307 and a gripping and tensioning solenoid 331, the other normally open pole 306B of the manual switch 306 being connected in parallel with the pole 306A and the manual switch 304 by a conductor 308. Also connected in parallel between the input lines 301 and 302 is the series combination including a normally open contact 309b of a control relay 309, a normally closed contact 310b of a control relay 310 and the coil 309a of the control relay 309, the normally open contacts 311b of a control relay 311 being connected in parallel with the relay contacts 310b. The junction between the relay contacts 309b and 310b is connected by a conductor 312 to the junction between the manual switch 304 and the pole 306A of the manual switch 306.

Also connected between the input lines 301 and 302 is the series combination including normally open contacts 309c of the control relay 309, a normally open limit switch LS3, normally open contacts 313b of a time delay relay 313, normally closed contacts 314b of a time delay relay 314 and a welding solenoid 332. Connected in parallel with the relay contacts 314b and the solenoid 332 is a series combination including normally open contacts 314c of the time delay relay 314 and a shearing solenoid 333. The input line 301 is also connected to the wiper of contact bank 305B of the selector switch 305, the "SHEAR" contact of the bank 305B being connected by a conductor 315 to the junction between the limit switch LS3 and the relay contacts 313b. Connected in parallel between the conductor 315 and the input line 302 are the coil 313a of the time delay relay 313 and the coil 311a of the time delay relay 311. Also connected between the input lines 301 and 302 is a series combination of normally closed contacts 309d of the control relay 309, normally open contacts 314d of the time delay relay 314, normally closed contacts 318b of a time delay relay 318 and a track opening solenoid 334. The junction between the relay contacts 314d and 318b is connected by a conductor 323 to the wiper of the contact bank 305C of the selector switch 305, the "ON" contact of the bank 305C being connected by a conductor 324 to the coil 318a of the time delay relay 318, which is in turn connected to the input line 302. There is also connected between the input lines 301 and 302 the series combination of normally open contacts 316b of a time delay relay 316 and coil 314a of the time delay relay 314. Also connected between the input lines 301 and 302 is the series combination of normally closed contacts 319b of a time delay relay 319, normally open contacts 313c of the time delay relay 313 and coil 316a of the time delay relay 316, normally open contacts 310c of the control relay 310 being connected in parallel with the relay contacts 313c, and coil 310a of the control relay 310 being connected in parallel with the coil 316a.

Also connected between the input lines 301 and 302 is the series combination of normally closed contacts 309e of the control relay 309, a normally open limit switch LS4, normally open contacts 319c of the time delay relay 319 and a strap feeding solenoid 335, the relay contacts 319c being connected in parallel with a normally open pole 307A of the manual switch 307. Connected in parallel with the relay contacts 319c and the solenoid 334 is the series combination of normally open contacts 318c of the time delay relay 318 and coil 319a of the time delay relay 319, the relay contacts 318c being connected in parallel with normally open contacts 321b of a control relay 321 and coil 319a being connected in parallel with coil 321a of the control relay 321. Finally, there is connected between the input lines 301 and 302 the series combination of normally open contacts 321c of the control relay 321 and a counter 322.

Welding current for the formation of the welded joint between the overlapped portions of the strap web 56 is provided by a welder, generally designated by the numeral 320, the welder 320 being coupled to a source of 230 volt, 60 Hz, single-phase electric power. The welder 320 includes the welding transformer 210 and the welding electrode assembly 200, the output of the transformer 210 being connected to the electrode assembly 200 through the control circuit 300 by means of power lines L1, L2, L3. More particularly, line L1 is connected through normally open contacts 316c of time delay relay 316 to the wiper of contact bank 305D of the selector switch 305, line L2 being connected through normally closed contacts 316d of the time delay relay 316 to the wiper of the contact bank 305D. Line L3 is directly connected to the "ON" contact of contact bank 305D, which contact bank is connected in parallel with a normally open manual welding switch 317.

Figure 14:
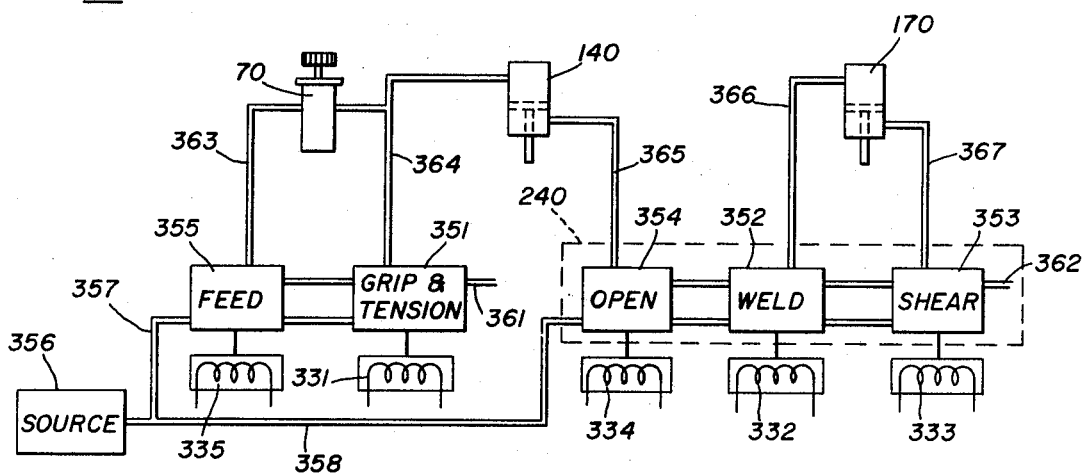
FIG. 14 is a schematic circuit diagram of the pneumatic control circuit of the strapping machine of the present invention.

Referring now to FIG. 14 of the drawings, there is illustrated a schematic diagram of the pneumatic control circuit 350 of the strapping machine 50. The control circuit 350 includes a source 356 of compressed air which is connected by an input conduit 357 to a solenoid-actuated strap feeding valve 355 and a solenoid-actuated gripping and tensioning valve 351, the valves 355 and 351 being respectively actuated by the solenoids 335 and 331. The source 356 is also connected by an input conduit 358 to a solenoid-actuated track opening valve 354, a solenoid-actuated welding valve 352 and a solenoid-actuated shearing valve 353, the valves 352, 353 and 354 being respectively actuated by the solenoids 332, 333 and 334. The valves 351 and 355 are each connected to a common exhaust conduit 361, while the valves 352, 353 and 354 are all connected to a common exhaust conduit 362, it being appreciated that exhaust conduits 361 and 326 may be connected for form a single common exhaust conduit. The feed valve 355 is connected by a conduit 363 to one side of the air motor 70, the other side of the air motor 70 being connected by a conduit 364 to the gripping and tensioning valve 351. The conduit 354 is also connected to the upper or head end of the piston 140, the lower or rod end of the piston 140 being connected by a conduit 365 to the track opening valve 354. The welding valve 352 is connected by a conduit 366 to the upper or head end of the piston 170, the lower or rod end of the piston 170 being connected by a conduit 367 to the shearing valve 353. It will be noted that normally the valves 351 to 355 are all closed so that no air is admitted to the air motor 70 or to either of the pistons 140 or 170, each of the pistons 140 and 170 being of the three-position type having a neutral position illustrated in the drawings and upper and lower operative positions.

The operation of the strapping machine 50 through a complete strapping cycle will now be described in detail. Initially, the mechanical components of the strapping machine will be in the configuration illustrated in FIGS. 2 through 8 of the drawings and the control circuit 300 will be in the condition illustrated in FIG. 12 of the drawings. Thus, the strap web 56 will be fed around the object 55 to form the strap loop 58, the leading end 57 of the strap web 56 being disposed in overlapping relationship with the supply portion of the strap web 56 as described above and as illustrated in FIG. 2. The pistons 140 and 170 will be in their neutral positions, thereby maintaining the gripping jaws 130 in their open position, the shear blade 220 in its retracted position and the shorting bar 190 and the welding contacts 209 in their spaced-apart strap-passing configuration, as is best illustrated in FIG. 8. The selector switch 305 will be in its "ON" position, the manual cycle switch 304, and welding switch 317 and the limit switch LS3 will be open, the limit switch LS4 will be held open by the strap web 56, and the double-pole manual switches 306 and 307 will be in the positions illustrated in FIG. 12, with poles 306A and 307B being closed and poles 306B and 307A being open. All solenoids and relays are de-energized and the relay contacts are all in the positions illustrated in FIG. 12. At this point, the manual cycle switch 304 is closed to initiate the operation of the joint-forming and tensioning head 100. Upon closing of the cycle switch 304, the control relay 309 and the gripping and tensioning solenoid 331 are energized through obvious circuits, the energization of the control relay 309 closing the relay contacts 309b and 309c and opening the relay contacts 309d and 309e. Closure of the relay contacts 309b completes a holding circuit for maintaining the control relay 309 and gripping and tensioning solenoid 331 energized after release of the cycle switch 304. The closing of the relay contacts 309c prepares the circuit for the initiation of the welding cycle, while the opening of the relay contacts 309d and 309e prevents the operation of the track opening and strap feeding portions of the cycle during the gripping and tensioning operation. The energization of the gripping and tensioning solenoid 331 opens the gripping and tensioning valve 351 to admit air from the source 356 through the conduit 364 to the air motor 70 and the head end of the piston 140. Accordingly, the air motor 70 is operated in a strap tensioning direction for taking up the slack in the strap loop 58 and the piston rod 144 of the piston 140 is moved downwardly from its neutral position for closing the gripping jaws 130 to securely clamp the strap web 56 between the gripping jaw teeth 135 and the gripping portion of the backing plate 85, in the manner described above. This closing of the gripping jaws 130 leaves the free leading end 57 of the strap web 56 in overlapping relationship with the supply portion of the strap web 56 in overlapping relationship with the supply portion of the strap web 56 and permits tensioning of the strap loop 58 about the object 55. The tensioning operation continues until a predetermined tension in the strap web 56 is reached, at which point the limit switch LS3 is closed in a manner described in detail in U.S. patent application Ser. No. 63,479, filed by Frank C. Weller, on Aug. 13, 1970, entitled "STRAPPING MACHINE", and assigned to the assignee of the present invention. At this point, the air motor 70 stalls, thereby maintaining tension in the strap loop 58 about the object 55.

The closing of the limit switch LS3 energizes time delay relay 313 and control relay 311 through the conductor 315. The energization of the control relay 311 closes relay contacts 311b to form an alternative holding circuit for the control relay 309, and the energization of time delay relay 313 closes relay contacts 313b and 313c after a predetermined time delay sufficient to permit the strap loop 58 to be further securely engaged about the object 55. The closure of relay contacts 313b energizes the welding solenoid 332 through an obvious energizing circuit, thereby opening the welding valve 352 to admit air from the source 356 through the conduit 356 to the head end of the piston 170. This application of air to the piston 170 moves the piston rod 174 downwardly from the neutral position thereof to thereby move the shorting bar 190 downwardly and move the welding contacts 209 upwardly, in the manner described above, until the tensioned reach 59 of the strap 56 and the overlapping free leading end 57 thereof and securely clamped together between the shorting bar 190 and the welding contacts 209, as is illustrated in FIG. 10 of the drawings.

The closing of the relay contacts 313c energizes the control relay 310 and the time delay relay 316, the energization of the control relay 310, thereby opening the relay contacts 310b and closing the relay contacts 310c. The closing of the relay contacts 310c forms a holding circuit for the control relay 310 and the time delay relay 316 around the relay contacts 313c. It will also be noted that the control relay 309 remains energized through the relay contacts 311b. The energization of the time delay relay 316, after a predetermined time delay, closes the relay contacts 316b and 316c and opens the relay contacts 316d. The opening of the contacts 316d and the closing of the contacts 316c completes a circuit between lines L1 and L3 of the welder 320 for applying a welding current to the contacts 209, thus spot welding the overlapped portions of the strap web 56 together in the manner described above. The closure of the relay contacts 316b energizes the time delay relay 314, the energization of the relay 314, after a predetermined time delay to permit completion of the welded joint, opens the relay contacts 314b and closes the relay contact 314c and 314d. The opening of the relay contacts 314b de-energizes the welding solenoid 332, thereby closing the welding valve 352 to shut off the supply of air to the head end of the piston 170, whereupon the piston rod 174 will be returned to its neutral position and the shorting bar 190 and the welding contacts 209 will be returned to their spaced-apart strap passing configuration under the urging of the compression spring 180 to release the welding pressure applied to the overlapped portions of the strap web 56.

The closing of the relay contacts 314d prepares the circuit for later energization of the track opening solenoid 334. The closing of the relay contacts 314c energizes the shearing solenoid 333, thereby opening the shearing valve 353 to admit air from the source 356 through the conduit 367 to the rod end of the piston 170. This application of compressed air to the rod end of the piston 170 moves the piston rod 174 upwardly from the neutral position thereof for lowering the shear blade 220 and severing the strap loop 58 from the supply portion of the strap web 56 in the manner described above. After the shearing of the strap web 56, the tension in the supply portion thereof is released, thereby reopening the limit switch LS3. The opening of the limit switch LS3 de-energizes the shearing solenoid 333, thereby closing the shearing valve 353 and shutting off the supply of air to the rod end of the piston 170, whereupon the piston rod 174 is returned to its neutral position and shear blade 220 is returned to its retracted position under the urging of the compression spring 237. The opening of the limit switch LS3 also serves to de-energize the control relay 311 and the time delay relay 313, the de-energization of the time delay relay 313 repoening the relay contacts 313b and 313c. It will be noted that the time delay relay 316 and the control relay 310 remain energized through the holding circuit provided by the closed relay contacts 310c.

The de-energization of the control relay 311 opens the relay contacts 311b for thereby de-energizing the control relay 309. The de-energization of the control relay 309 reopens the relay contacts 309b and 309c and recloses the relay contacts 309d and 309e. The reopening of the relay contacts 309b de-energizes the gripping and tensioning solenoid 331, for thereby closing the valves 351 and shutting off the supply of air to the air motor 70 and to the head end of the piston 140. Thus, the air motor 70 will stop, the inertia of the motor and the idler wheel 75 and feed wheel 65 being sufficient to withdraw the severed end of the strap web 56 beneath the straightening roll 90, as described above. The reclosing of the relay contacts 309c prepares an energizing circuit for the feed solenoid 335.

The reclosing of the relay contacts 309d energizes the track opening solenoid 334 and the time delay relay 318, the energization of the solenoid 334 opening the valve 354 to admit air from the source 356 through the conduit 365 to the rod end of the piston 140. This application of air to the rod end of the piston 140 moves the piston rod 144 upwardly from the neutral position thereof to thereby move the welding carriage 150, including the welding contacts 209 and the strap guides 165 and 166, to the strap releasing position thereof, and moving the gripping jaws 130 back to the open position thereof for releasing the strap loop 58 from the joint-forming and gripping head 100, in the manner described above. A predetermined time after the energization of the time delay relay 318, sufficient to permit the removal of the strapped object from the strapping machine 50, the relay contacts 318b are opened and the relay contacts 318c are closed. The opening of the relay contacts 318b de-energizes the track opening solenoid 334, thereby closing the valve 354 for shutting off the supply of air to the piston 140 and permitting the return of the welding carriage 150 back to the strap passing position thereof under the urging of the compression spring 169. The cooperation between the camming roll 137 and the cam surface 147 on the cam member 145 returns the piston rod 144 to its neutral position, as described above.

It will be noted that, upon the tensioning of the strap loop 58 tightly about the object 55, the displacement of the strap loop 58 from between the retaining flanges 94 of the side plates 95 and the bottom surface 88 of the backing plate 85 has already effected the closing of the limit switch LS4. Thus, upon closing of the relay contacts 318c, the control relay 321 and the time delay relay 319 are energized. Upon energization of the control relay 321 the relay contacts 321b and 321c close, the closing of the relay contacts 321b completing a holding circuit for the control relay 321 and the time delay relay 319 around the relay contacts 318c, and the closing of the relay contacts 321c energizing the counter 322 for registering one count for the just completed strapping cycle.

A predetermined time after the energization of the time delay relay 319, sufficient to assure the return of the welding carriage 150 to its strap-passing position, the relay contacts 319b open and the relay contacts 319c close. The closing of the relay contacts 319c energizes the feeding solenoid 335, thereby opening the feed valve 355 to admit air from the source 356 through the conduit 353 to the air motor 70 for operating the air motor 70 in the strap-feeding direction. Thus, the leading end of the strap web 56 will be again fed from the backing plate 85 through the slot 114, over the welding contacts 209 and the strap guide 166, between the side plates 235, around the object 55, and back between the retaining flanges 94 on the side plates 95 and the bottom surface 88 of the backing plate 85, at which point the strap web 56 reopens the limit switch LS4. It will be noted that the opening of the relay contacts 319b serves to de-energize the delay relay 310 and the time delay relay 316, whereby all of the relays with the exception of relays 319 and 321 are returned to their original de-energized conditions. The reopening of the limit switch LS4 serves to de-energize the feed solenoid 335 and the control relay 321 and the time delay relay 310, whereby all of the relays are now returned to their original de-energized conditions, de-energization of the control relays 321 serving to reopen the relay contacts 321c for de-energizing the counter 322. The de-energization of the feed solenoid 335 recloses the feed valve 355 to shut off the supply of air to the air motor 70 and terminate the rotation thereof. However, the inertia of the feed wheel 65 and the idler wheel 75 and the strap web 56, causes the strap web 56 to continue to be fed for a short time sufficient to permit the leading end 57 thereof to pass between the open gripping jaws 130 and over the guide member 165 and the welding contacts 209 until it abuts against the guide member 166. At this point, the strap web 56 will again be in the configuration illustrated in FIGS. 2 and 8 with the leading end 57 thereof overlapping the supply portion thereof between the guide members 165 and 166 and between the shorting bar 190 and the welding contacts 209. The joint-forming and gripping head 100 may now be recycled by again closing the cycle switch 304 to again tension and weld the strap loop 58 about another object 55.

It will be noted that the selector switch 305 permits operation of the strapping machine 50 in a manual mode, in addition to the semiautomatic mode just described. Thus, should the strap web 56 become jammed in the strapping machine 50, the jam can be cleared by manually operating the selector switch 305 to the "SHEAR" position. This de-energizes the welder control by opening contact bank 305D and energizes the control relay 311 and the time delay relay 313 by closing contact bank 305B. The energization of the control relay 311 and 313 will effect energization of the welding solenoid 332, the shearing solenoid 333 and the track opening solenoid 334 in the manner described above, for immediately operating the welding pressure, shearing and track opening portions of the cycle, thus shearing the jammed part of the strap from the supply portion thereof and permitting removal of the jammed strap from the strapping machine 50. Since the selector switch contact bank 305C will now be opened, the energization of time relay 318 will be prevented, whereby the welding carriage 150 will remain in its releasing position and the track will remain open until the selector switch 305 is turned to its "OFF" position, in which position contact bank 305A will be opened thereby de-energizing the entire control circuit 300.

It will also be noted that the welding switch 317 permits a manual operation of the welder 320, while the selector switch 305 is in its "SHEAR" position. Thus, by closing the welding switch 317, the open selector switch contact bank 305D is bypassed for completing a circuit between the lines L1 and L3 when the relay contacts 316c are closed after energization of the time delay relay 316.

It will also be noted that the manual switch 307 permits manual energization of the strap feed solenoid 335 for manually controlling the feeding of the strap web 56 about the object 55. Thus, when the switch 307 is manually operated from the normal position illustrated in FIG. 12, the pole 307A is closed for energizing the strap feed solenoid 335 to initiate feeding of the strap web 56 and the pole 307B is opened to prevent energization of the gripping and tensioning solenoid 331 during this manual feeding operation. In like manner, the manual tensioning switch 306 permits manual energization of the gripping and tensioning solenoid 331 when the switch 307 is in its normal position illustrated in FIG. 12. Thus, when the switch 307 is manually moved from its normal position, illustrated in FIG. 12, the pole 306A is opened and the pole 306B is closed thereby directly energizing the gripping and tensioning solenoid 331 and bypassing the cycle switch 304 and the control relay 309 so that the welding and shearing operations cannot be performed during the manual tensioning operation.

Figure 13:
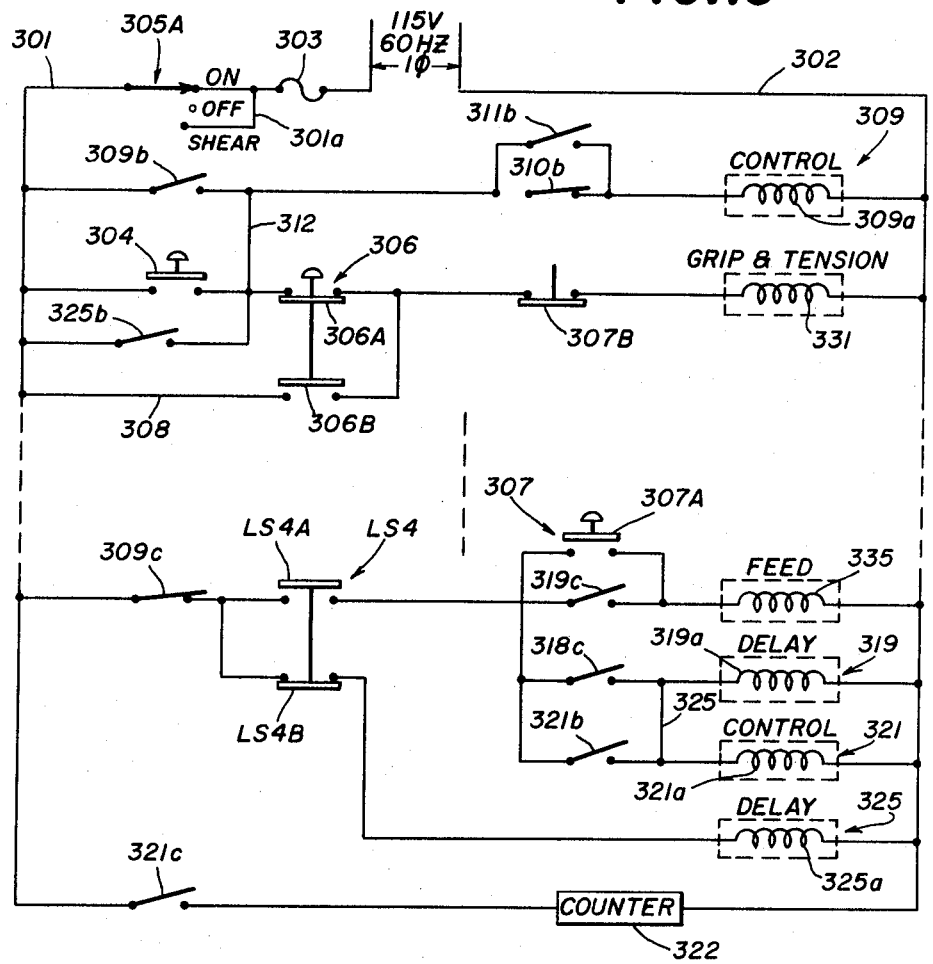
FIG. 13 is a fragmentary schematic circuit diagram illustrating a modification of the electric control circuit for the strapping machine of the present invention.

Referring now to FIG. 13 of the drawings, there is illustrated an alternative embodiment of the control circuit 300 of this invention for permitting a fully automatic operation of the strapping machine 50. The control circuit of FIG. 13 is essentially the same as that of FIG. 12 in both structure and function, whereby only the modified portions of the control circuit have been illustrated in FIG. 13, the same reference numerals being applied to the unchanged portions of FIG. 13 as were applied to the corresponding portions in FIG. 12. It will be noted that in the embodiment of FIG. 13, the limit switch LS4 is a double-pole single-throw switch including a normally open pole LS4A, corresponding to the limit switch LS4 of FIG. 12, and a normally closed pole LS4B. The pole LS4B of the limit switch LS4 is connected in series with the coil 325a of a time delay relay 325 between the input line 302 and junction between the relay contacts 309c and the limit switch pole LS4A. The time delay relay 325 is provided with normally open contacts 325b connected in parallel with the cycle switch 304.

Thus, after the completion of a strapping operation and the removal of the strapped object from the strapping machine 50, the limit switch LS4 will be operated to close pole LS4A, and the strap web 56 will be refed through the joint-forming and gripping head 100 and about the next object 55, in the manner described with respect to FIG. 12. Upon reentry of the leading end 57 of the strap web 56 into the head 100, the limit switch LS4 will again be actuated for opening the pole LS4A and de-energizing the strap feed solenoid 335, the time delay relay 319 and the control relay 321, all in the usual manner. However, simultaneously with the opening of the pole LS4A of the limit switch LS4, the pole LS4B thereof will be closed, thereby energizing the time delay relay 325. A predetermined time after the energization of the relay 325, sufficient to permit the momentum of the strap feeding mechanism to carry the leading end 57 of the strap web 56 back into the head 100 into overlapping relationship with the supply portion of the strap web 56, as illustrated in FIG. 2, the relay contacts 325b will be closed. The closure of the relay contacts 325b automatically reinitiates the strapping cycle, just as if the cycle switch 304 had been manually operated. In this manner, the strapping machine 50 will continually recycle automatically until the selector switch is moved from its "ON" position.

It will be appreciated that a suitable switch may be inserted in the series with the time delay relay 325 to permit manual selection of the fully automatic mode of operation of FIG. 13 or the semi-automatic mode which was described in connection with FIG. 12.

From the foregoing, it will be seen that there has been provided a novel strapping machine which permits the forming of a welded strap joint between overlapped portions of a strap web, while one of those overlapped portions is in a tensioned condition. More particularly, there has been provided a strapping machine wherein a pair of welding contacts are disposed on one side of overlapped portions of the strap web and a shorting bar is disposed on the opposite sides of the overlapped portions of the strap web, the shorting bar and the welding contacts being movable toward each other for clamping the overlapped portions of the strap therebetween.

In addition, there has been provided a novel drive linkage for operating the shorting bar and the welding contacts to their welding configuration so that substantially equal forces are applied to the overlapped portions of the strap.

In addition, there has been provided a strapping machine including means for severing the completed strap loop from the supply portion of the strap web after completion of the welded joint.

Also, there has been provided means for withdrawing the welding contacts from between the strap loop and the strapped object after completion of the welded joint for permitting removal of the strapped object from the strapping machine in any of a plurality of mutually perpendicular directions.

Finally, there has been provided novel control apparatus for controlling the operation of the strapping machine of this invention in a semi-automatic mode or a fully automatic and continually recycling mode, or in any of several specialized manual modes.

While there have been described what are at present considered to be the preferred embodiments of the invention, it will be understood that various modifications may be made therein and it is intended to cover in the appended claims all such modifications as fall within the true spirit and scope of the invention.

What is claimed is:

1. A strapping machine for securing a length of strap around an object, said strapping machine comprising a strap gripper for gripping the strap adjacent to the leading end thereof to provide a free end portion and for holding the strap encircled in a loop about the object with the free end portion of the strap overlapping the supply portion thereof, tensioning means for tensioning the loop of strap by withdrawing the supply portion thereof relative to the leading end thereof to provide a tensioned reach of strap overlapping said free end portion thereof, two welding contact members respectively disposed on opposite sides of the overlapped portions of the strap wherein one of said welding contact members is disposed between the object and the strap and each movable respectively between a strap-passing position therefor and a welding position therefor, said welding contact members in the strap-passing positions thereof being spaced apart and disposed from between the object and the strap for accommodating ready passage of the strap therebetween, said welding contact members in the welding positions thereof cooperating firmly to clamp the free end portion of the strap against the tensioned reach of strap and between said welding contact members, drive mechanism coupled to said welding contact members for effecting movement thereof between the strap-passing positions and the welding positions thereof, movement of said welding contact members to the welding positions thereof effecting movement of the free end portion of the strap toward and into contact with the overlapping tensioned reach thereof, and means coupling said welding contact members to a source of electric power for forming a welded joint between the free end portion of the strap and the overlapping tensioned reach thereof when said welding contact members are in the welding positions thereof.

2. The strapping machine set forth in claim 1, wherein said drive mechanism effects movement of said welding contact members between the strap passing positions and the welding positions thereof in directions substantially normal to the plane of the adjacent portion of the strap.

3. The strapping machine set forth in claim 1, wherein said drive mechanism includes a fluid-actuated piston, and drive linkage coupling said piston to said welding contact members.

4. The strapping machine set forth in claim 1, wherein said drive mechanism includes a fluid-actuated piston, and drive linkage coupling said piston to said welding contact members, said linkage being constructed and arranged for moving said contact members so that substantially equal forces are applied to the opposite sides of the overlapped portions of the strap.

5. The strapping machine set forth in claim 1, wherein the overlapping portions of the strap are disposed substantially horizontally, said welding contact members being respectively disposed above and below the overlapped portions of the strap.

6. A strapping machine for securing a length of strap around an object, said strapping machine comprising two guide members spaced apart a predetermined distance longitudinally of the strap and cooperating to define a joint-forming region therebetween, a strap gripper disposed adjacent to one of said guide members out of said joint-forming region for gripping the strap adjacent to the leading end thereof to provide a free end portion, said strap gripper holding the strap encircled in a loop about the object with the free end portion of the strap disposed in said joint-forming region and with the supply portion of the strap extending across said guide members, tensioning means for tensioning the loop of strap by withdrawing the supply portion thereof relative to the leading end thereof to provide a tensioned reach of strap extending across said guide members and overlapping the free end portion of the strap, two welding contact members respectively disposed on opposite sides of the overlapped portions of the strap wherein one of said two welding contact members is disposed between the object and the strap and each movable respectively between a strap-passing position therefor and a welding position therefor, said welding contact members in the strap-passing positions thereof being spaced apart and disposal from between the object and the strap for accommodating ready passage of the strap therebetween, said welding contact members in the welding positions thereof cooperating firmly to clamp the free end portion of the strap against the tensioned reach of strap and between said welding contact members, drive mechanism coupled to said welding contact members for effecting movement thereof between the strap-passing positions and the welding positions thereof, movement of said welding contact members to the welding positions thereof effecting movement of the free end portion of the strap toward and into contact with the overlapping tensioned reach thereof, and means coupling said welding contact members to a source of electric power for forming a welded joint between the free end portion of the strap and the overlapping tensioned reach thereof.

7. The strapping machine set forth in claim 6, wherein said strap gripper cooperates with said one guide member for clamping the strap therebetween.

8. The strapping machine set forth in claim 6, wherein the free leading end of the strap terminates adjacent to the other of said guide members.

9. The strapping machine set forth in claim 6, wherein said welding contact members are disposed between said two guide members, said welding contact members in the welding positions thereof holding the overlapped portions of the strap together in said joint-forming region.

10. A strapping machine for securing a length of strap around an object, said strapping machine comprising two guide members spaced apart a predetermined distance longitudinally of the strap and cooperating to define a joint-forming region therebetween, a strap gripper disposed adjacent to one of said guide members out of said joint-forming region for gripping the strap adjacent to the leading end thereof to provide a free end portion, said strap gripper holding the strap encircled in a loop about the object with the free end portion of the strap disposed in said joint-forming region and with the supply portion of the strap extending across said guide members in overlapping relation with the free end portion of the strap, tensioning means for tensioning the loop of strap by withdrawing the supply portion thereof relative to the leading end thereof to provide a tensioned reach of strap extending across said guide members and overlapping the free end portion of the strap, two welding contact members respectively disposed on opposite sides of the overlapped portions of the strap wherein one of said two welding contact members is disposed between the object and the strap and each movable respectively between a strap-passing position therefor and a welding position therefor, said welding contact members in the strap-passing positions thereof being spaced apart and disposed from between the object and the strap for accommodating ready passage of the strap therebetween said welding contact members in the welding positions thereof cooperating firmly to clamp the free end portion of the strap against the tensioned reach of strap and between said welding contact members, first drive mechanism coupled to said welding contact members for effecting movement thereof between the strappassing positions and the welding positions thereof, movement of said welding contact members to the welding positions thereof effecting movement of the free end portion of the strap toward and into contact with the overlapping tensioned reach thereof, means coupling said welding contact members to a source of electric power for forming a welded joint between the free end portion of the strap and the overlapping tensioned reach thereof to provide a welded strap loop, a shear blade movable between a retracted position out of contact with the strap and a shearing position for severing the supply portion of the strap from the welded strap loop, second drive mechanism coupled to said shear blade for effecting movement thereof between the retracted position and the shearing position thereof, and control apparatus coupled to said first and second drive mechanisms and responsive to the tensioning of the strap to a predetermined tension for sequentially moving said welding contact members to the welding positions thereof for forming the welded joint and then returning said welding contact members to the strap-passing positions thereof and then moving said shear blade to the shearing position thereof to sever the supply portion of the strap, whereby the strap loop is first welded in the tensioned condition thereof and is subsequently severed from the supply portion of the strap.

11. The strapping machine set forth in claim 10, wherein said shear blade is disposed adjacent to said one guide member, said shear blade in the shearing position thereof cooperating with said one guide member for shearing the supply portion of the strap therebetween.

12. The strapping machine set forth in claim 10, wherein said two drive mechanisms comprise parts of a common drive assembly for effecting movement of both said shear blade and said welding contact members.

13. The strapping machine set forth in claim 10, and further including a fluid-actuated piston coupled to each of said two drive mechanisms and movable among a neutral condition and a welding condition and a shearing condition, said piston in the neutral condition thereof holding said welding contact members in the strap-passing positions thereof and said shear blade in the retracted position thereof, movement of said piston to the welding condition thereof effecting operation of said first drive mechanism for moving said welding contact members from the strap-passing positions thereof to the welding positions thereof, movement of said piston to the shearing condition thereof effecting operation of said second drive mechanism for moving said shear blade from the retracted position to the shearing position thereof.

14. A strapping machine for securing a length of strap around an object, said strapping machine comprising a strap gripper for gripping the strap adjacent to the leading end thereof to provide a free end portion and for holding the strap encircled in a loop about the object with the free end portion of the strap overlapping the supply portion thereof, tensioning means for tensioning the loop of strap by withdrawing the supply portion thereof relative to the leading end thereof to provide a tensioned reach of strap overlapping said free end portion thereof, a pair of welding electrodes disposed on one side of the overlapped portions of the strap and movable between a strap-passing position and a welding position, a shorting bar disposed on the other side of the overlapped portions of the strap and movable between a strap-passing position and a welding position, said pair of welding electrodes and said shorting bar in the respective strap-passing positions thereof being spaced apart for accommodating ready passage of the strap therebetween, said pair of welding electrodes and said shorting bar in the respective welding positions thereof cooperating firmly to clamp the free end portion of the strap against the tensioned reach of strap with the overlapped portions of the strap therebetween, drive mechanism coupled to said welding electrodes and to said shorting bar for effecting simultaneous movement thereof between the respective strap-passing positions and welding positions thereof, movement of said welding electrodes and said shorting bar to the respective welding positions thereof effecting movement of the free end portion of the strap toward and into contact with the tensioned reach thereof, and means coupling said welding electrodes to a source of electric power for forming a welded joint between the free end portion of the strap and the tensioned reach thereof.

15. The strapping machine set forth in claim 14, wherein said welding electrodes are disposed between the object and the overlapped portions of the strap and said shorting bar is disposed on the opposite side of the overlapped portion of the strap away from the object.

16. The strapping machine set forth in claim 14, wherein the planes of the overlapped portions of the strap are disposed substantially horizontally, said pair of welding electrodes being disposed beneath the overlapped portions of the strap between the strap and the object, said shorting bar being disposed above the overlapped portions of the strap.

17. A strapping machine for securing a length of strap around an object, said strapping machine comprising a strap gripper for holding the strap encircled in a loop about the object with the leading end of the strap overlapping the supply portion thereof, tensioning means for tensioning the loop of strap by withdrawing the supply portion thereof relative to the leading end thereof, welding means for forming a welded joint between the overlapped portions of the strap and movable between a welding position and a releasing position, said welding means in the welding position thereof extending between the object and the strap and holding the overlapped portions of the strap in contact with each other for forming a welded joint therebetween, said welding means in the releasing position thereof being disposed from between the object and the strap for accommodating removal of the welded strap loop from said welding means in any of a plurality of directions substantially normal to the longitudinal axis of the adjacent portion of the strap, and drive mechanism coupled to said welding means for effecting movement thereof between the welding position and the releasing position thereof, whereby said strapping machine accommodates ready release of the strapped object therefrom.

18. The strapping machine set forth in claim 17, and further including means biasing said welding means toward the welding positions thereof, said drive mechanism effecting movement of said welding means to the releasing position thereof against the urging of said bias means.

19. The strapping machine set forth in claim 17, wherein the welded strap loop is removable from said welding means in directions both normal to and parallel to the plane of the overlapped portions of the strap.

20. The strapping machine set forth in claim 17, wherein the welded strap loop is removable from said welding means in either of two opposite directions laterally of the overlapped portions of the strap and in a direction substantially normal to the plane of the overlapped portions of the strap.

21. A strapping machine for securing a length of strap around an object, said strapping machine comprising a strap gripper for holding the strap encircled in a loop about the object with the leading end of the strap overlapping the supply portion thereof, tensioning means for tensioning the loop of strap by withdrawing the supply portion thereof relative to the leading end thereof, a first welding contact member disposed adjacent to the overlapped portions of the strap on the side thereof away from said object, a second welding contact member disposed adjacent to the overlapped portions of the strap and movable laterally thereof between a welding position and a releasing position, said second welding contact member in the welding position thereof extending between the object and the strap for cooperating with said first welding contact member for holding the overlapped portions of the strap in contact with each other to form a welded joint therebetween, said second welding contact member in the releasing position thereof being disposed from between the object and the strap for accommodating removal of the welded strap loop from said welding contact members in any of a plurality of directions substantially normal to the longitudinal axis of the adjacent portion of the strap, and drive mechanism coupled to said second welding contact member for effecting movement thereof between the welding position and the releasing position thereof in directions substantially laterally of the overlapped portions of the strap to thereby accommodate ready release of the strapped object from said strapping machine.

22. The strapping machine set forth in claim 21, wherein said second welding contact member is mounted for pivotal movement about an axis substantially parallel to the longitudinal axis of the overlapped portions of the strap.

23. The strapping machine set forth in claim 21, wherein said first welding contact member comprises a shorting bar, and said second welding contact member comprises a pair of welding electrodes.

24. A strapping machine for securing a length of strap around an object, said strapping machine comprising a strap gripper for gripping the strap adjacent to the leading end thereof to provide a free end portion and for holding the strap encircled in a loop about the object with the free end portion of the strap overlapping the supply portion thereof, tensioning means for tensioning the loop of strap by withdrawing the supply portion thereof relative to the leading end thereof to provide a tensioned reach of strap overlapping said free end portion thereof, a first welding contact member disposed adjacent to the overlapped portions of the strap on the side thereof away from said object and movable between a strap-passing position and a welding position, a second welding contact member disposed adjacent to the overlapped portions of the strap and movable among a strap-passing position and a welding position and a releasing position, said welding contact members in the respective strap-passing positions thereof being spaced apart for accommodating ready passage of the strap therebetween, said welding contact members in the respective welding positions thereof cooperating firmly to clamp the free end portion of the strap against the tensioned reach of strap and between said welding contact members with said second welding contact member extending between the object and the strap, said second welding contact member in the releasing position thereof being disposed from between the object and the strap for accommodating removal of the welded strap loop from said welding contact members in any of a plurality of directions substantially normal to the longitudinal axis of the adjacent portion of the strap, first drive mechanism coupled to said first and second welding contact members for effecting movement thereof between the strap-passing positions and the welding positions thereof, movement of said welding contact members to the welding positions thereof effecting movement of the free end portion of the strap toward and into contact with the overlapping tensioned reach thereof, second drive mechanism coupled to said second welding contact member for effecting movement thereof between the strap-passing position and the releasing position thereof, and means coupling said welding contact members to a source of electric power for forming a welded joint between the free end portion of the strap and the overlapping tensioned reach thereof when said welding contact members are in the welding positions thereof.

25. The strapping machine set forth in claim 24, wherein said welding contact members are movable between the strap-passing positions thereof and the welding positions thereof in directions substantially normal to the plane of the overlapped portions of the strap, said second welding contact member being movable between the strap-passing position and the releasing position thereof in directions substantially laterally of the overlapped portions of the strap.

26. The strapping machine set forth in claim 24, wherein each of said first and second drive mechanisms includes a fluid-actuated piston.

27. A strapping machine for securing a length of strap around an object, said strapping machine comprising two gripping members movable between an open configuration and a closed configuration, said gripping members in the open configuration thereof being spaced apart for accommodating free passage of the strap therebetween, said gripping members in the closed configuration thereof cooperating for securely gripping the strap therebetween to hold the strap encircled in a loop about the object with the leading end of the strap overlapping the supply portion thereof, tensioning means for tensioning the loop of strap by withdrawing the supply portion thereof relative to the leading end thereof, welding means for forming a welded joint between the overlapped portions of the strap and movable between a welding position and a releasing position, said welding means in the welding position thereof extending between the object and the strap and holding the overlapped portions of the strap in contact with each other for forming a welded joint therebetween to provide a welded strap loop, said welding means in the releasing position thereof being disposed from between the object and the strap for accommodating removal of the welded strap loop from said welding means in any of a plurality of directions substantially normal to the longitudinal axis of the adjacent portion of the strap, drive mechanism coupled to said gripping members for effecting movement thereof between the open configuration and the closed configuration thereof, said drive mechanism being coupled to said welding means for effecting movement thereof between the welding position and the releasing position thereof, and control apparatus coupled to said drive mechanism and responsive to completion of said welded strap loop for operating said drive mechanisms to move said gripping members from the closed configuration thereof to the open configuration thereof and to move said welding means from the welding position thereof to the releasing position thereof.

28. The strapping machine set forth in claim 27, wherein said welding means is movable to a strap-passing position intermediate the welding position and the releasing position thereof, said welding means being movable between the welding position and the strap-passing position thereof in directions substantially normal to the plane of the overlapped portions of the strap, said welding means being movable between the strap-passing position and the releasing position thereof in directions substantially laterally of the overlapped portions of the strap.

29. A strapping machine for securing a length of strap around an object, said strapping machine comprising two gripping members movable between an open configuration and a closed configuration, said gripping members in the open configuration thereof being spaced apart for accommodating free passage of the strap therebetween, said gripping members in the closed configuration thereof cooperating for securely gripping the strap therebetween to hold the strap encircled in a loop about the object with the leading end of the strap overlapping the supply portion thereof, tensioning means for tensioning the loop of strap by withdrawing the supply portion thereof relative to the leading end thereof, a first welding contact member disposed adjacent to the overlapped portions of the strap on the side thereof away from said object and movable between a strap-passing position and a welding position, a second welding contact member disposed adjacent to the overlapped portions of the strap and movable among a strap-passing position and a welding position and a releasing position, said welding contact members in the respective strap-passing positions thereof being spaced apart for accommodating ready passage of the strap therebetween, said welding contact members in the respective welding positions thereof cooperating firmly to clamp the free end portion of the strap against the tensioned reach of strap and between said welding contact members with said second welding contact member extending between the object and the strap, means coupling said welding contact members to a source of electric power for forming a welded joint between the free end portion of the strap and the overlapping tensioned reach thereof to provide a welded strap loop when said welding contact members are in the welding positions thereof, said second welding contact member in the releasing position thereof being disposed from between the object and the strap for accommodating removal of the welded strap loop from said welding contact members in any of a plurality of directions substantially normal to the longitudinal axis of the adjacent portion of the strap, a shear blade movable between a retracted position out of contact with the strap and a shearing position for severing the supply portion of the strap from the welded strap loop, first drive mechanism coupled to said welding contact members for effecting movement thereof between the strap-passing positions and the welding positions thereof, said first drive mechanism being coupled to said shear blade for effecting movement thereof between the retracted position and the shearing position thereof, second drive mechanism coupled to said gripping members for effecting movement thereof between the open configuration and the closed configuration thereof, said second drive mechanism being coupled to said second welding contact member for effecting movement thereof between the strap-passing position and the releasing position thereof, and control apparatus coupled to said drive mechanisms and responsive to tensioning of the strap loop to a predetermined tension for operating said drive mechanisms to form the welded joint and for then operating said drive mechanisms to sequentially move said welding contact members from the welding positions thereof to the strap passing positions thereof and then to move said shear blade to the shearing position thereof to sever the supply portion of the strap and then to move said gripping members to the open configuration thereof and then to move said second welding contact member from the strap-passing position thereof to the releasing position thereof.

30. The strapping machine set forth in claim 29, wherein each of said first and second drive mechanisms includes a fluid-actuated piston.

* * * * *